(12) United States Patent
Mitsuhashi et al.

(10) Patent No.: US 10,474,931 B2
(45) Date of Patent: Nov. 12, 2019

(54) IMAGE GROUP TITLE ASSIGNING DEVICE, IMAGE GROUPING DEVICE, REPRESENTATIVE IMAGE DETERMINATION DEVICE FOR IMAGE GROUP, IMAGE DISPLAY DEVICE, CAMERA, AND IMAGE DISPLAY PROGRAM

(71) Applicant: NIKON CORPORATION, Tokyo (JP)

(72) Inventors: Setsu Mitsuhashi, Tokyo (JP); Mikiya Tanaka, Chigasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/074,316

(22) Filed: Mar. 18, 2016

(65) Prior Publication Data
US 2016/0224870 A1   Aug. 4, 2016

Related U.S. Application Data

(60) Continuation of application No. 14/663,335, filed on Mar. 19, 2015, now abandoned, which is a division of
(Continued)

(30) Foreign Application Priority Data

Jan. 18, 2008   (JP) .................................. 2008-008990
Apr. 24, 2008   (JP) .................................. 2008-113706
(Continued)

(51) Int. Cl.
*G06K 9/62*        (2006.01)
*G06F 16/583*   (2019.01)
(Continued)

(52) U.S. Cl.
CPC ......... *G06K 9/6267* (2013.01); *G06F 16/583* (2019.01); *G06K 9/00624* (2013.01);
(Continued)

(58) Field of Classification Search
CPC .............. G06K 9/6267; G06K 9/6201; G06K 9/00624; H04N 9/8042; H04N 5/91;
(Continued)

(56) References Cited

U.S. PATENT DOCUMENTS

| 6,594,383 B1 | 7/2003 | Syeda-Mahmood |
| 7,035,467 B2 | 4/2006 | Nicponski |

(Continued)

FOREIGN PATENT DOCUMENTS

| JP | 2002-352218 A | 12/2002 |
| JP | 2003-141130 A | 5/2003 |

(Continued)

OTHER PUBLICATIONS

Mar. 10, 2009 Search Report issued in International Patent Application No. PCT/JP2008/071867 (with translation.).
(Continued)

*Primary Examiner* — Samir A Ahmed
(74) *Attorney, Agent, or Firm* — Oliff PLC

(57) ABSTRACT

An image group title assigning device includes: a title candidate assigning means for assigning a plurality of title candidates to an image group having a plurality of images; a characteristic amount calculating means for individually calculating characteristic amounts of a plurality of images included in the image group in association with each of the plurality of title candidates; and a title determining means for determining a title representing the image group from among the title candidates based upon a characteristic amount of each of the images calculated for each of the title candidates.

8 Claims, 21 Drawing Sheets

Related U.S. Application Data application No. 12/811,760, filed as application No. PCT/JP2008/071867 on Dec. 2, 2008, now abandoned.

(30) Foreign Application Priority Data

| Apr. 24, 2008 | (JP) | 2008-113707 |
|---|---|---|
| Apr. 24, 2008 | (JP) | 2008-113708 |
| Apr. 24, 2008 | (JP) | 2008-113709 |

(51) Int. Cl.

| G06K 9/00 | (2006.01) |
|---|---|
| H04N 5/77 | (2006.01) |
| H04N 9/804 | (2006.01) |
| H04N 5/91 | (2006.01) |
| H04N 5/907 | (2006.01) |
| H04N 9/82 | (2006.01) |

(52) U.S. Cl.
CPC ............ *G06K 9/6201* (2013.01); *H04N 5/772* (2013.01); *H04N 5/91* (2013.01); *H04N 9/8042* (2013.01); *H04N 5/907* (2013.01); *H04N 9/8205* (2013.01)

(58) Field of Classification Search
CPC ...... H04N 5/772; H04N 9/8205; H04N 5/907; G06F 17/30247
See application file for complete search history.

(56) References Cited

U.S. PATENT DOCUMENTS

| 7,194,134 | B2 | 3/2007 | Bradshaw | |
|---|---|---|---|---|
| 7,346,211 | B2 | 3/2008 | Fan | |
| 7,382,903 | B2 | 6/2008 | Ray | |
| 7,386,165 | B2 | 6/2008 | Dundar et al. | |
| 7,444,022 | B2 | 10/2008 | Paschalakis | |
| 7,869,647 | B2 | 1/2011 | Li | |
| 8,000,538 | B2 | 8/2011 | Sarkar | |
| 8,249,366 | B2 | 8/2012 | Mei et al. | |
| 8,792,685 | B2* | 7/2014 | Sangster | G06K 9/00295 382/118 |
| 2004/0172440 | A1* | 9/2004 | Nakajima | G06F 21/608 709/200 |
| 2006/0056737 | A1* | 3/2006 | Ohtsuka | G06F 17/30274 382/305 |
| 2006/0069999 | A1* | 3/2006 | Mitsuhashi | H04N 1/00132 715/723 |
| 2006/0192862 | A1 | 8/2006 | Ono et al. | |
| 2007/0031041 | A1* | 2/2007 | Ko | G06K 9/00234 382/190 |
| 2007/0103565 | A1 | 5/2007 | Xu et al. | |
| 2007/0230799 | A1* | 10/2007 | Shniberg | G06F 17/30259 382/224 |
| 2008/0219558 | A1* | 9/2008 | Lu | G06K 9/00234 382/190 |
| 2009/0092277 | A1* | 4/2009 | Ofek | G06K 9/00664 382/100 |
| 2009/0304272 | A1 | 12/2009 | Makadia et al. | |
| 2012/0020524 | A1* | 1/2012 | Ishikawa | H04N 7/183 382/103 |

FOREIGN PATENT DOCUMENTS

| JP | 2004-336170 A | 11/2004 |
|---|---|---|
| JP | 2005-352718 A | 12/2005 |
| JP | 2006-079461 A | 3/2006 |
| JP | 2006-203574 A | 8/2006 |
| JP | 2006-236266 A | 9/2006 |
| JP | 2006-259932 A | 9/2006 |
| JP | 2006-314010 A | 11/2006 |
| JP | 2007-011637 A | 1/2007 |
| JP | 2007-094990 A | 4/2007 |
| JP | 2007-129434 A | 5/2007 |
| JP | 3914747 B2 | 5/2007 |
| JP | 2007-174378 A | 7/2007 |

OTHER PUBLICATIONS

Dec. 13, 2011 Office Action issued in Japanese Patent Application No. 2008-113708 (with translation).
Jun. 26, 2012 Japanese Office Action issued in Japanese Patent Application No. 2008-113709 (with translation).
Jun. 26, 2012 Japanese Office Action issued in Japanese Patent Application No. 2008-113707 (with translation).
Jun. 26, 2012 Japanese Office Action issued in Japanese Patent Application No. 2008-113706 (with translation).
Apr. 3, 2013 Office Action issued in Japanese Patent Application No. 2008-307329 (with translation).
May 9, 2013 Office Action issued in U.S. Appl. No. 12/811,760.
Feb. 13, 2014 Office Action issued in U.S. Appl. No. 12/811,760.
Apr. 9, 2013 Office Action issued in Japanese Patent Application No. 2008-307329 (with translation).
U.S. Appl. No. 12/811,760, filed Jul. 6, 2010 in the name of Mitsuhashi.
Dec. 18, 2015 U.S. office action issued in U.S. Appl. No. 14/663,335.

* cited by examiner

FIG.8

| MONTH | EVENT CANDIDATES |
|---|---|
| JANUARY | NEW YEAR'S SHRINE VISIT, NEW YEAR'S PARTY, SKIING |
| FEBRUARY | TRADITIONAL END OF WINTER, SKIING |
| MARCH | DOLL FESTIVAL, GRADUATION CEREMONY, SKIING |
| APRIL | ENTRANCE CEREMONY, CHERRY BLOSSOM VIEWING, WEDDING |
| MAY | CHERRY BLOSSOM VIEWING, FIELD DAY, WEDDING |
| JUNE | GOLFING, CAMPING, WEDDING |
| JULY | CAMPING, SEA BATHING, DIVING |
| AUGUST | CAMPING, DIVING |
| SEPTEMBER | GOLFING, EXCURSION, WEDDING |
| OCTOBER | FIELD DAY, LEAF PEEPING, WEDDING |
| NOVEMBER | SEVEN-FIVE-THREE FESTIVAL, WEDDING |
| DECEMBER | CHRISTMAS, YEAR END PARTY |

FIG.12

| TITLE EVENT | SELECTION CRITERION INFORMATION |
|---|---|
| WEDDING, NEW YEAR'S SHRINE VISIT, DOLL FESTIVAL, ENTRANCE CEREMONY, GRADUATION CEREMONY | PROPORTION OF "FACE" REGION IN IMAGE IS CLOSE TO PREDETERMINED PROPORTION |
| LEAF PEEPING, DIVING, SEA BATHING, GOLFING | PROPORTION OF SPECIFIC COLOR REGION IN IMAGE IS CLOSE TO PREDETERMINED PROPORTION |
| OTHER THAN ABOVE | PROBABILITY P BEING EVENT IS MAXIMUM |

FIG.14

| METROPOLIS AND PREFECTURES | EVENT CANDIDATES |
|---|---|
| TOKYO | TOKYO TOWER, SHINJUKU GYOEN NATIONAL GARDEN, ODAIBA ⋯ |
| KANAGAWA | MINATO MIRAI, HAKONE, SHONAN ⋯ |
| CHIBA | DISNEY RESORT, NARITA INTERNATIONAL AIRPORT, MOTHER FARM ⋯ |
| SAITAMA | ZOO, NAGATORO, FOREST PARK ⋯ |
| GUNMA | KUSATSU, HARUNA, MYOGI ⋯ |
| IBARAKI | TSUKUBA, KAIRAKUEN PARK, KASHIMA SHRINE ⋯ |
| TOCHIGI | NIKKO, NASU, KINUGAWA ⋯ |

FIG.15

| TITLE EVENT | SELECTION CRITERION INFORMATION |
|---|---|
| TRIP TO HOKKAIDO | SHOOTING POSITION INFORMATION IS CLOSE TO POSITION INFORMATION CORRESPONDING TO PLACES OF INTEREST |
| DIVING, SEA BATHING | PROPORTION OF SPECIFIC COLOR REGION IN IMAGE IS CLOSE TO PREDETERMINED PROPORTION<br><br>FOCAL LENGTH OF TAKING LENS IS LONGER THAN PREDETERMINED VALUE |
| FIELD DAY | MOVEMENT INFORMATION OF MAIN SUBJECT IS GREATER THAN PREDETERMINED VALUE |
| OTHER THAN ABOVE | PROBABILITY P OF BEING EVENT IS MAXIMUM |

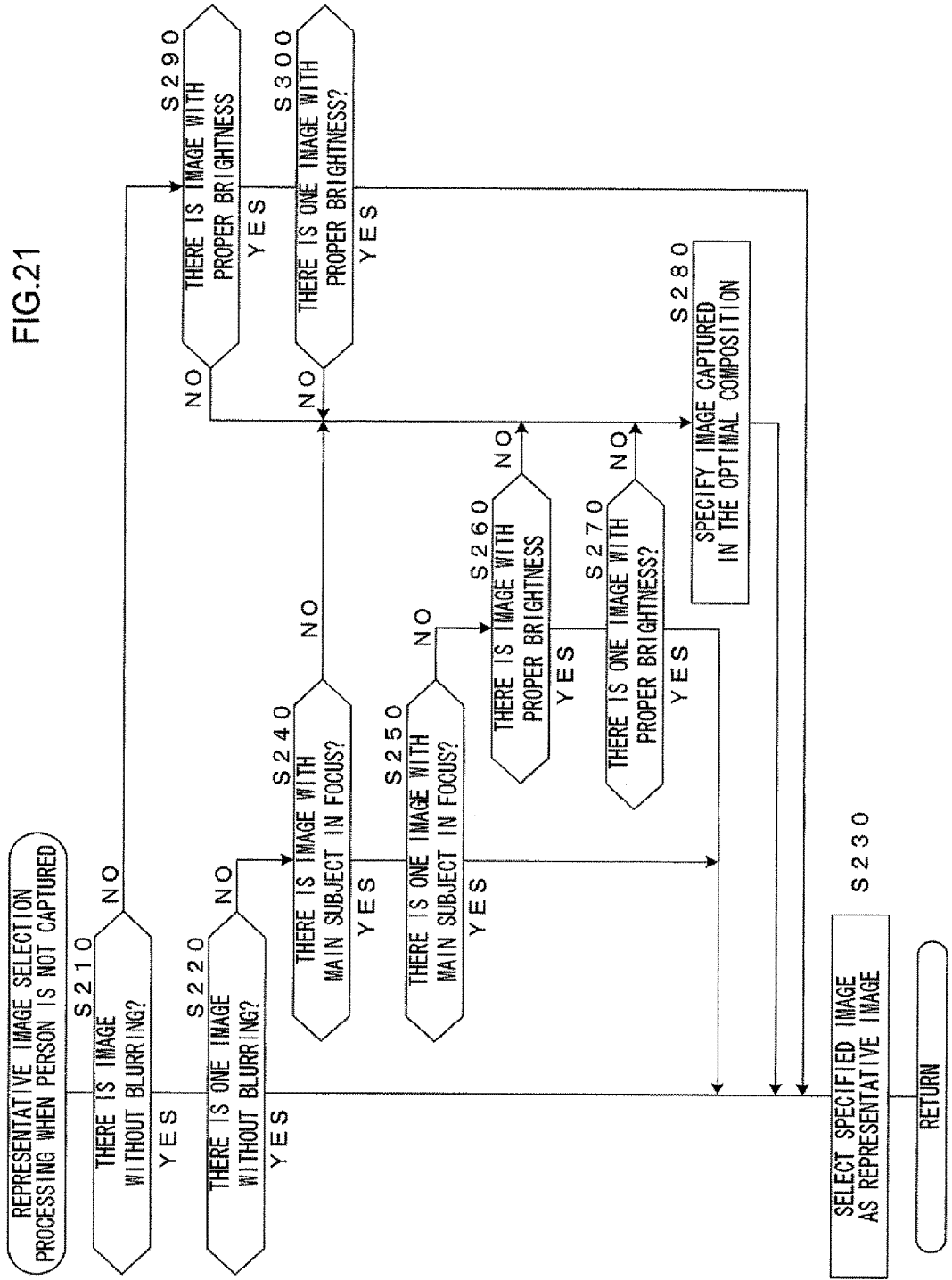

IMAGE GROUP TITLE ASSIGNING DEVICE, IMAGE GROUPING DEVICE, REPRESENTATIVE IMAGE DETERMINATION DEVICE FOR IMAGE GROUP, IMAGE DISPLAY DEVICE, CAMERA, AND IMAGE DISPLAY PROGRAM

This is a Continuation Application of application Ser. No. 14/663,335, filed Mar. 19, 2015, which is a Divisional Application of application Ser. No. 12/811,760 filed Jul. 6, 2010 which is a National Phase of PCT/JP2008/071867 filed Dec. 2, 2008 which claims priority to JP 2008-113709 filed Apr. 24, 2008, JP 2008-113708 filed Apr. 24, 2008, JP 2008-113707 filed Apr. 24, 2008, JP 2008-008990 filed Jan. 18, 2008 and JP 2008-113706 Filed Apr. 24, 2008. The disclosures of the prior applications are hereby incorporate by reference herein in their entireties.

TECHNICAL FIELD

The present invention relates to a title assigning device, an image grouping device, a representative image determination device for an image group, an image display device, a camera, and an image display program.

BACKGROUND ART (1) There is a known art for distinguishing a semantic classification (for example, a shooting scene) of individual images constituting an image group based upon a characteristic amount of each of the images and for determining the semantic classification of the said image group based upon the characteristic amount of the image group using distinguish results with respect to each of the images (refer to patent reference literature 1).

(2) There is a known art for extracting identification information from an image itself or attribute information of the image, and for identifying an event of the said image based upon the extracted identification information (refer to patent reference literature 2).

(3) There is a known art for grouping a plurality of images based upon individual shooting date and time information of the said plurality of images. For instance, processing is performed so as to put the images into successive groups in time series based upon shooting frequency information aggregated for each predetermined shooting period (refer to patent reference literature 3).

(4) There is a known art for selecting at image representing characteristics of a group from among grouped images (refer to patent reference literature 4). Evaluation values representing the likelihood of scenery, still life, portrait, or the like are individually calculated from the images constituting the group. In the event that the number of scenery images is the largest among the images in the group, an image with the largest evaluation value about scenery is selected as the representative image among the scenery images.

(5) There is a known album creating apparatus as follows. The album creating apparatus selects an image of a subject appearing most frequently in grouped images as a representative image (main image) (refer to patent reference literature 5).

| [Patent reference literature 1] | U.S. Pat. No. 7,035,467 |
| [Patent reference literature 2] | Japanese Laid Open Patent Publication No. 2007-129434 |
| [Patent reference literature 3] | Japan Patent No. 3914747 |
| [Patent reference literature 4] | Japanese Laid Open Patent Publication No. 2007-94990 |
| [Patent reference literature 5] | Japanese Laid Open Patent Publication No. 2006-259932 |

DISCLOSURE OF THE INVENTION

Problems to be Solved by the Invention (1) Both in processing of individual images and in processing of an image group including these images, the conventional technology uses the SVM (Support Vector Machine) method, which performs distinguish processing based upon a characteristic amount thereof. There is an issue yet to be addressed effectively in that load of processing increases when the SVM method is used for an image group including a plurality of images.

(2) According to the conventional technology, there is an issue yet to be addressed effectively in that, as the number of types of titles (an event name, subject name, or the like) of images to be identified increases, identification information to be extracted increases and load of identification processing performed based upon the said identification information increases.

(3) According to the conventional technology, there is an issue yet to be addressed effectively in that, if a plurality of groups put together based upon shooting frequency information are included in a predetermined shooting period, the said plurality of groups are put into the same group even if the shooting scene (shooting target) varies among the groups.

(4) In the conventional technology, there is an issue yet to be addressed effectively in that load of calculation processing necessary to determine a representative image increases with an increase in the number of types of evaluation values to be calculated such as scenery, portrait, still life, event, and commemorative photograph.

(5) The conventional devices are not configured in consideration of a method to select an appropriate image, in the event that there are a plurality of images of a subject appearing most frequently in a group, as a representative image from among them.

Means for Solving the Problems (1) According to a first aspect of the present invention, an image group title assigning device, comprises: a title candidate assigning means for assigning a plurality of title candidates to an image group having a plurality of images; a characteristic amount calculating means for individually calculating characteristic amounts of a plurality of images included in the image group in association with each of the plurality of title candidates; and a title determining means for determining a title representing the image group from among the title candidates based upon a characteristic amount of each of the images calculated for each of the title candidates.

According to a second aspect of the present invention, in the image group title assigning device according to the first aspect, it is also possible that the title determining means calculates, for each of the title candidates, probability information of each of the images corresponding to the individual title candidates, further calculates a sum of probability information of equal to or greater than a predetermined value among the probability information for each of the title candidates, and determines a title candidate having a maximum value of the sum of the probability information as a title representing the image group.

According to a third aspect of the present invention, in the image group title assigning device according to the second aspect, if with respect to the title candidate, a number of images having probability information of equal to or greater than the predetermined value to a number of images included in the image group falls below a predetermined proportion, the title determining means may exclude said title candidate.

According to a fourth aspect of the present invention, in the image group title assigning, device according to the first aspect, the image group may be grouped according to shooting date and time.

According to a fifth aspect of the present invention, in the image group title assigning device according to the first aspect, the image group may be grouped according to shooting position.

According to a sixth aspect of the present invention, in the image group title assigning device according to the fourth or fifth aspect, the title candidate assigning means may assign the plurality of title candidates in accordance with the shooting date and time or the shooting position.

According to a seventh aspect of the present invention, a camera comprises an image group title assigning device according to any one of the first to sixth aspects.

(2) According a eighth aspect of the present invention, an image title assigning device comprises: a title candidate assigning means tin assigning as predetermined number of title candidates to an image; a characteristic amount calculating means for calculating a characteristic amount of the image in association with each of the predetermined number of title candidates; and a title determining means for determining a title of the image from among the title candidates based upon the characteristic amount of the image calculated for each of the title candidates.

According to a ninth aspect of the present invention, in the image title assigning device according to the eighth aspect, the title candidate assigning means may select a predetermined number of title candidates in accordance with shooting date and time information.

According to a tenth aspect of the present invention, in the image title assigning device according to the eighth or ninth aspect, the title candidate assigning means may select a predetermined number of title candidates in accordance with shooting position information.

According to a 11th aspect of the present invention, the image title assigning device according to any one of the eighth to tenth aspects may further comprise a face detection means for detecting a face of a person in the image based upon data of said image. In this case, the title candidate assigning means may select a predetermined number of title candidates according to whether or not a face has been detected by the face detection means.

According to a 12th aspect of the present invention, the image title assigning device according to the 11th aspect may further comprise a face identification means for identifying a face of the person. In this case, the title candidate assigning means may select a predetermined number of title candidates in accordance with an identification result of a face by the face identification means.

According to a 13th aspect of the present invention, in the image title assigning device according to any one of the eighth to 12th aspects, it is also possible that the title candidate assigning means assigns a predetermined number of title candidates to an image group having a plurality of images; the characteristic amount calculating means individually calculates characteristic amounts of a plurality of images included in the image group in association with each of the predetermined numbers of title candidates; and the title determining means determines a title representing the image group from among the title candidates based upon the characteristic amount of the image calculated for each of the title candidates.

According to a 14th aspect of the present invention, a camera comprises an image title assigning device according to any one of the eighth to 13th aspects.

(3) According to a 15th aspect of the present invention, an image grouping device comprises: a characteristic amount calculating means for individually calculating, for each of image groups having a plurality of images, characteristic amounts of a plurality of images included in each image group; a title determining means for determining a title representing each of the image groups based upon characteristic amounts of the individual images; a calculation means for calculating time difference information between the image groups based upon information of shooting date and time of individual images included in the plurality of image groups; and an integration means for putting the image groups into one image group if titles determined by the title determining means are same and time difference information calculated by the calculation means is equal to or less than a predetermined value.

According to a 16th aspect of the present invention, in the image grouping device according to the 15th aspect, it is also possible that the plurality of image groups are each grouped based upon the information of shooting date and time; and the characteristic amount calculating means individually calculates characteristic amounts associated with the information of shooting date and time.

According to a 17th aspect of the present invention, in the image grouping device according to the 15th or 16th aspect, the time difference information may be a difference between a last shooting time of an image included in one image group and an earliest shooting time of an image included in another image group.

According to a 18th aspect of the present invention, in the image grouping device comprises: a characteristic amount calculating means for individually calculating, for each of image groups having a plurality of images, characteristic amounts of a plurality of images included in each image group: a title determining means for determining a title representing each of the image groups based upon characteristic amounts of the individual images; a calculation means for calculating distance information between the image groups based upon shooting position information of individual images included in the plurality of image groups; and an integration means for putting the image groups into one image group if titles determined by the title determining means are same and distance information calculated by the calculation means is equal to or less than a predetermined value.

According to a 19th aspect of the present invention, in the image grouping device according to the 18th aspect, it is also possible that the plurality of image groups are each grouped based upon the shooting position information; and the characteristic amount calculating means individually calculates characteristic amounts associated with the shooting position information.

According to a 20th aspect of the present invention, in the image grouping device according to the 18th or 19th aspect, the distance information may be a shortest distance between a shooting position of an image included in one image group and a shooting position of an image included in another image group.

According to a 21st aspect of the present invention, a camera comprises an image grouping device according to any one of the 15th to 20th aspects.

(4) According to a 22nd aspect of the present invention, a representative image determination device for image group comprises: a determination means for determining an image representing an image group having a plurality of images from said image group; and a control means for controlling the determination means so as to determine the representative image based upon selection criterion information, which is set according to a title assigned to the image group, to select the representing image.

According to a 23rd aspect of the present invention, the representative image determination device for image group according to the 22nd aspect may further comprise a storage means for storing in advance a plurality of selection criterion information each corresponding to a plurality of titles. In this case, the control means may read out selection criterion information corresponding to a title assigned to the image group from the storage means and, based upon said selection criterion information, controls the determination means so as to determine a representative image.

According to a 24th aspect of the present invention, in the representative image determination device for image group according to the 23rd aspect, the selection criterion information may include information to instruct processing performed in accordance with the title. In this case, the determination means may determine the representative image based upon a result of the processing.

According to a 25th aspect of the present invention, in the representative image determination device for image group according to the 24th aspect, the selection criterion information may include position information related to an area name included in the title. In this case, the determination means may determine the representative image based upon shooting position information of individual images constituting the image group and position information read out from the storage means.

According to a 26th aspect of the present invention, in the representative image determination device for image group according to the 24th aspect, the selection criterion information may include information of color corresponding to the title. In this case, the determination means may determine the representative image based upon region information of the color in individual images constituting the image group.

According to a 27th aspect of the present invention, in the representative image determination device for image group according to the 24th aspect, processing performed in accordance with the title may include an instruction to obtain subject tracking information related to individual images constituting the image group. In this case, the determination means may determine the representative image based upon the obtained subject tracking information.

According to a 28th aspect of the present invention, a camera comprises a representative image determination device according to any one of the 22nd to 27th aspects.

(5) According to a 29th aspect of the present invention, an image display device comprises: a subject recognition means for carrying out subject recognition processing for image data grouped on a predetermined condition in advance and classified and recorded in each group so as to recognize a subject included in an image; a setting means for setting a selection criterion to select a representative image from image data recorded in each group based upon a recognition result by the subject recognition means; and a selection means for selecting the representative image from image data recorded in each group based upon the selection criterion set by the setting means.

According to a 30th aspect of the present invention, it may be arranged to display information related to the representative image selected by the selection means and information related to a group that includes the representative image in association with each other.

According to a 31st aspect of the present invention, it may be possible to, as a result of a subject recognition, to make a decision as to whether or not an image in which a person is captured is included in each group, and, when a decision is made that an image in which a person is captured is included, to set a first selection criterion as the selection criterion, whilst, when a decision is made that an image in which a person is captured is not included, to set a second selection criterion as the selection criterion.

According to a 32nd aspect of the present invention, the first selection criterion may be a selection criterion to select the representative image based upon a face of a person captured in an image.

According to a 33rd aspect of the present invention, in the 32nd aspect, it is preferable that the first selection criterion is a selection criterion to select the representative image by making a decision as to whether or not a face of the person is a face of a family member or an acquaintance, whether or not a face of the person is facing a front, whether or not a face of the person is a smile, and whether or not an area of a face of the person is a greatest.

According to a 34th aspect of the present invention, it is preferable that the second selection criterion is a selection criterion to select the representative image by making a decision as to whether or not the image is not blurring, whether or not the image has a main subject in focus, whether or not the image is with proper brightness, and whether or not the image is captured in an optimal composition.

Advantageous Effect of the Invention (1) According to the present invention, load of processing to assign a title representing an image group can be reduced.
(2) According to the present invention, load of processing to put a title to an image can be reduced.
(3) According to the present invention, a plurality of images can be grouped appropriately.
(4) According to the present invention, processing necessary to determine a representative image can be reduced.
(5) According to the present invention, an appropriate image can be selected as a representative image from among images included in a group.

BRIEF DESCRIPTION OF THE DRAWINGS

FIG. 8 A figure showing an example of an event candidate table.

FIG. 1F A figure showing an example of an event decision (cherry blossom viewing) for clusters.

FIG. 12 A figure showing an example of a selection criterion information table.

FIG. 14 A figure showing an example of an event candidate table according to the second embodiment.

FIG. 15 A figure showing an example of a selection criterion information table according to the third embodiment.

FIG. 21 A flowchart showing the flow of "representative image selection processing in the event that a person is not photographed".

BEST MODE FOR CARRYING OUT THE INVENTION

The best mode for carrying out the present invention will now be explained.

First Embodiment

Figure 1:
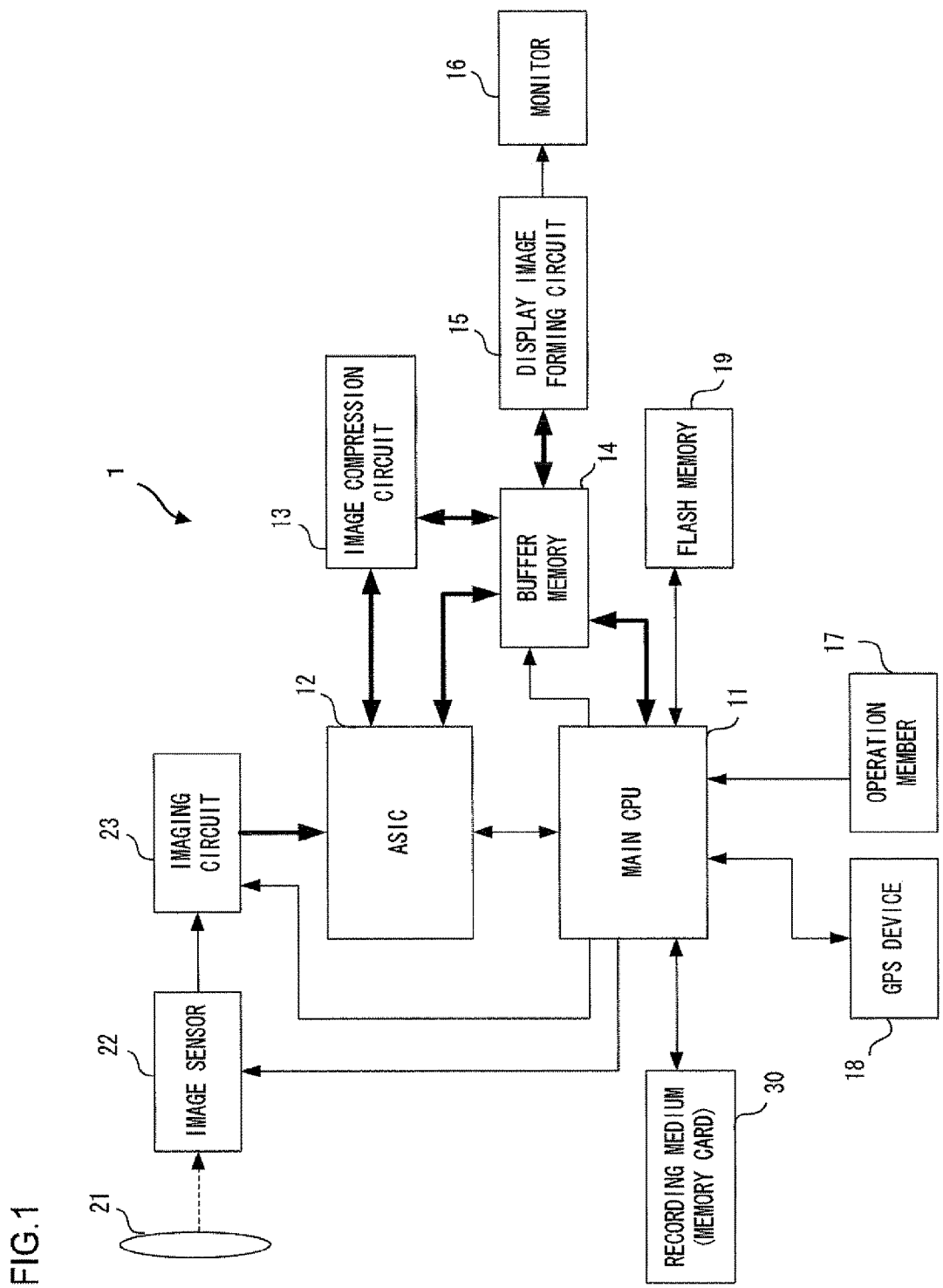
FIG. 1 A block diagram explaining the structure of a main section of an electronic camera according to an embodiment of the present invention.

FIG. 1 is a block diagram explaining the structure of the main section of an electronic camera 1 according to an embodiment of the present invention. The electronic camera 1 is controlled by a main CPU 11.

A photographic lens 21 forms a subject image on an imaging plane of an image sensor 22. The image sensor 22, being constituted with a CCD image sensor and the like, captures a subject image on the imaging plane and outputs an image-capturing signal to an imaging circuit 23. Color filters of R (red), G (green), and B (blue) are provided on the imaging plane of the image sensor 22 so that each of the color filters corresponds to a pixel location. Since the image sensor 22 captures the subject image through the color filters, a photoelectric conversion signal output from the image sensor 22 includes RGB color information.

The imaging circuit 23 performs analog processing (gain control and the like) on the photoelectric conversion signal output from the image sensor 22 and converts an analog image-capturing signal into digital data through a built-in A/D conversion circuit.

The main CPU 11 inputs a signal output from each block, carries out a predetermined operation, and outputs a control signal based upon the operation result to each of the blocks. An image processing circuit 12, being configured, for instance, as an ASIC (application specific integrated circuit), performs image processing for a digital image signal input through the imaging circuit 23. The image processing includes, for example, edge enhancement, color temperature adjustment (white balance adjustment) processing, and format conversion processing for the image signal.

An image compression circuit 13 performs image compression processing, for instance, at a predetermined compression ratio in JPEG format on the image signal having undergone the processing performed by the image processing circuit 12. A display image forming circuit 15 forms display data so as to display a photographed image on an LCD monitor 16.

A buffer memory 14 is used so as to temporarily store data before and after image processing and during image processing, as well as storing an image file before recorded in a recording medium 30 and storing an image file read out from the recording medium 30.

The recording medium 30 is constituted with, for instance, a memory card that can be attached to and detached from the electronic camera 1. In response to an instruction from the main CPU 11, data of a captured image and an image file containing information of the captured image are recorded in the recording medium 30. The image file recorded in the recording medium 30 can be read out in response to an instruction from the main CPU 11.

A program to be executed by the main CPU 11, data necessary for processing performed by the main CPU 11, and the like are stored in a flash memory 19. It is arranged that the contents of the program and the data stored in the flash memory 19 can be added and modified in response to an instruction from the main CPU 11.

Operation members 17, including a variety of buttons and switches of the s electronic camera 1, output operation signals to the main CPU 11 in response to the operation content of each of the operation members such as a depression operation of a release button and a switch operation of a mode changeover switch.

In response to an instruction from the main CPU 11, a GPS device 18 receives radio waves from a GPS satellite and outputs a received signal to the main CPU 11. Based upon the received signal from the GPS device 18, the main CPU 11 carries out a predetermined operation so as to detect positioning information (latitude, longitude, and altitude) of the electronic camera 1.

The electronic camera 1 is configured to carry out predetermined image processing and compression processing for an image signal obtained at the image sensor 22 when photography is performed and to generate an image file in which additional information including positioning information and information related to the said captured image is added to the image data having undergone the compression processing. More specifically, the electronic camera 1 stores image data in JPEG format in an image data unit and generates an image file in Exif format in which the additional information is stored in an additional information unit. The image file in Exif format is an image file in which a thumbnail image and additional information data are embedded in image data in JPEG image format. The generated image file is stored in the recording medium 30.

It is arranged that the electronic camera 1 can be switched in between a shooting mode and a reproduction mode. The shooting mode is an operation mode to capture a subject image and save data of the captured image in the recording medium 30 as an image file. The reproduction mode is a mode to display a reproduction image based upon the image data on the LCD monitor 16 by reading out the captured image data from the recording medium 30 or the like.

<Grouping of Captured Images>

The electronic camera 1 of the present embodiment includes a function to automatically group captured images. More specifically, the electronic camera 1 groups image files recorded in the recording medium 30 and stores the image files into a folder provided for each group. In addition, based upon the image group included in each folder, the electronic camera 1 determines a title (for instance, captured scene) representing the shooting target of the image group. Then, based upon the title, the electronic camera 1 selects, for each folder (group), individual image files representing an image group of each folder (group). It is to be noted that it may also be arranged that the electronic camera 1 creates a control table of the image files and, stores grouping information for the image files in the said table, in place of storing the image files in the folder provided for each group.

Figure 2:
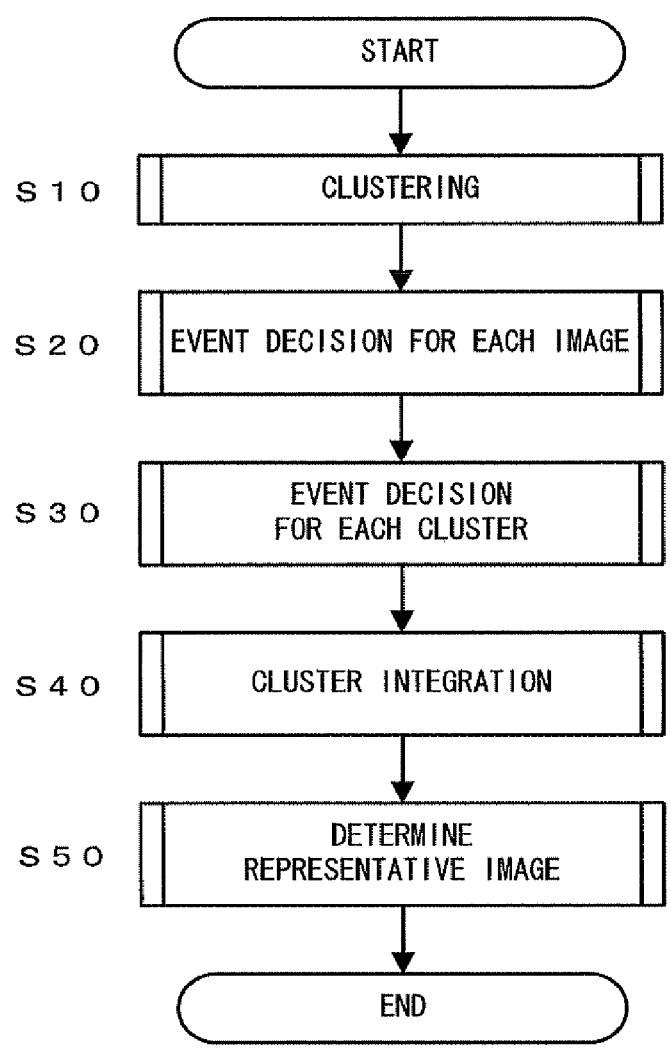
FIG. 2 A flowchart explaining the flow of grouping processing executed by a main CPU.

FIG. 2 is a flowchart explaining the flow of the grouping processing executed by the main CPU 11. Upon input of an operation signal instructing execution of grouping processing from the operation members 17, the main CPU 11 starts processing of FIG. 2.

In a step S10 of FIG. 2, the main CPU 11 uses a clustering method so as to group image files recorded in the recording medium 30 and causes the flow of control to proceed to a step S20. The clustering processing will be described later in detail. In the step S20, the main CPU 11 performs an event decision for each image included in a cluster (set of grouped image files) and causes the flow of control to proceed to a step S30. Here, an "Event" represents the shooting scene of an image, including, for instance, "Field Day", "Wedding", "Cherry Blossom Viewing", "Sea Bathing", and "Trip to Hokkaido". The event decision processing for each image will be described later in detail.

In the step S30, the main CPU 11 performs an event decision for each cluster and causes the flow of control to proceed to a step S40. Although the steps S20 and S30 are the same in that "Event" is a title, they are different in that the event decision targets individual images in the step S20 whilst the event decision targets an "Event" representing each cluster in the step S30. The event decision processing for each cluster will be described later in detail.

In the step S40, the main CPU 11 integrates the clusters according to requirements and causes the flow of control to proceed to a step S50. The cluster integration processing will be described later in detail. In the step S50, the main CPU 11 determines an image file representing the cluster and terminates the flow of control of FIG. 2.

<Clustering Processing>

Figure 3:
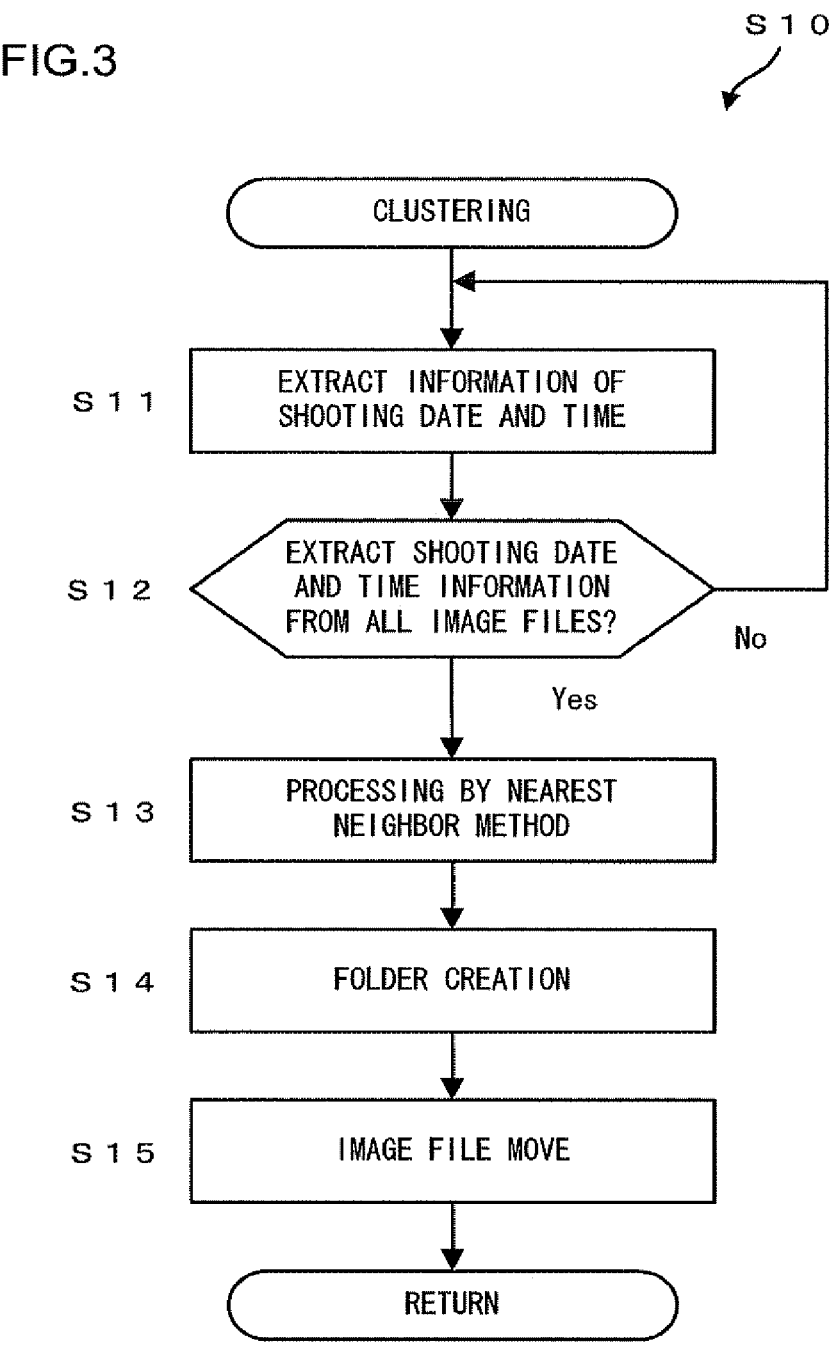
FIG. 3 A flowchart explaining clustering processing.

The clustering processing (S10) will now be explained in detail with reference to the flowchart shown as an example in FIG. 3. The clustering processing is performed using, for instance, shooting date and time information. In a step S11 of FIG. 3, the main CPU 11 extracts, for all the image files, information showing shooting date and time recorded in an additional information unit of the image file and causes the flow of control to proceed to a step S12.

In the step S12, the main CPU 11 makes a decision as to whether or not information showing shooting date and time has been extracted from all the image files. In the event that necessary information has been extracted from all the image files, the main CPU 11 makes a positive decision in the step S12 and causes the flow of control to proceed to a step S13, whilst in the event that necessary information has not been extracted from all the image files, the main CPU 11 makes a negative decision in the step S12 and causes the flow of control to return to the step S11. In the event of returning to the step S11, the extraction processing is repeated.

In the step S13, the main CPU 11 uses a hierarchical clustering, in which, for instance, the nearest neighbor method is used for clustering. More specifically, with one cluster as a starting point of processing for each image, the main CPU 11 groups image files into a plurality of clusters (sets of image files with the similar period of shooting time) by repeating processing to sequentially integrate clusters with the similar period of shooting time. In the event that the number of clusters is reduced to a predetermined number, the main CPU 11 causes the flow of control to proceed to a step S14. Alternatively, in the event that the difference between the last shooting time in one set and the earliest shooting time in the other set exceeds a predetermined period of time (for instance, three hours) in adjacent clusters, the main CPU 11 causes the flow of control to proceed to the step S14. It is to be noted that a method other than the nearest neighbor method may be used among the hierarchical clustering. In addition, a method other than those of the hierarchical clustering (for example, a partitioning-optimization method) may also be used.

In the step S14, the main CPU 11 creates folders in the recording medium 30 corresponding to the clusters and causes the flow of control to proceed to a step S15. In the step S15, the main CPU 11 moves corresponding image files to the created folders and terminates the flow of control of FIG. 3. As a result, the image files belonging to each of the clusters are stored in each of the folders corresponding to the clusters. It is to be noted that it may also be arranged that the main CPU 11 creates a control table of the image files and stores grouping information for the image files in the said table, in place of storing the image files in the folder provided for each group.

<Event Decision Processing for Each Image>

The event decision processing (S20) in terms of image will now be explained in detail with reference to the flowchart shown as an example in FIG. 4. In a step S21 of FIG. 4, the main CPU 11 specifies one cluster from among the plurality of clusters and causes the flow of control to proceed to a step S22. The specifying order is, for instance, a chronological order with respect to shooting data and time (priority is given to the cluster having an image file of the earliest shooting time).

In the step S22, the main CPU 11 determines events (referred to as event candidates) to be decision targets. With reference to the event candidate table shown as an example in FIG. 8, the main CPU 11 selects events corresponding to the month of the shooting date of an image file constituting the cluster. For example, in the case where an image file was captured in May, the main CPU 11 renders "Cherry Blossom Viewing", "Field Day", and "Wedding" event candidates. The event candidate table, including events that take place frequently in each month, is created in advance based upon past events which took place in respective month and is recorded in the flash memory 19.

According to FIG. 8, events that are strongly associated with the months and seasons in which they take place are included only in corresponding months, whilst events that are weakly associated with the months in which they take place such as "Wedding" are included in a plurality of months. If the shooting date of an image file constituting the cluster belongs to a plurality of months, the main CPU 11 selects an event candidate corresponding to a month to which more image files belong, as an example. After determining the event to be a decision target as described above, the main CPU 11 causes the flow of control to proceed to a step S23.

In the step S23, the main CPU 11 specifies one image file from among the specified image files constituting the cluster and causes the flow of control to proceed to a step S24. In the step S24, based upon image data included in the specified image file, the main CPU 11 calculates the characteristic amount of the said image and causes the flow of control to proceed to a step S25.

The main CPU 11 calculates the characteristic amount of the image that is appropriate to make a decision as to the event candidate determined in the step S22. The relation between the event candidate and the characteristic amount to be calculated is tabled in advance and recorded in the flash memory 19. The characteristic amount is, for instance, color information, sharpness information, texture information, pattern information, brightness information, and the like, which are calculated based upon pixel data constituting a predetermined region of the image. In addition, the site of the image and information on a color histogram may be included as the characteristic amount. Since the characteristic amount calculation is a publicly known technique, detailed descriptions related to the characteristic amount calculation will be curtailed in the present explanation.

In the step S25 to a step S27, the main CPU 11 uses identifiers corresponding to the event candidates determined in the step S22 so as to calculate the probability of being each event. The identifiers are characteristic amount information calculated by machine learning using the SVM (Support Vector Machine) method based upon a plurality of sample image data. For instance, the identifier for "Cherry Blossom Viewing" is characteristic amount information calculated based upon a plurality of sample images of "Cherry Blossom Viewing" and "Non-Cherry Blossom Viewing". The identifier for "Field Day" is characteristic amount information calculated based upon a plurality of sample images of "Field Day" and "Non-Field Day". The identifier for "Wedding" is characteristic amount information calculated based upon a plurality of sample images of "Wedding" and "Non-Wedding". In the present embodiment, the identifier corresponding to each of the plurality of event candidates are created in advance and recorded in the flash memory 19. In the present description, an example with three event candidates is explained. The main CPU 11 calculates, for each image specified in the step S23, the probability P of being an event listed in the event candidates and causes the flow of control to proceed to a step S28.

The probability P of being an event corresponds to the distance between the boundary that divides a characteristic amount space represented by the identifier (for instance, the boundary between the "Field Day" region and the "Non-field Day" region) and the characteristic amount calculated in the step S14. The probability of being "Field Day" is high if a characteristic amount calculated from an image is located at the back of the characteristic amount region corresponding to "Field Day" in the characteristic amount space represented by the identifier for "Field Day" and the distance to the characteristic amount region corresponding to "Non-field Day" is long. On the other hand, the probability of being "Field Day" is low if the characteristic amount calculated from the image is located at the edge of the characteristic amount region corresponding to "Field Day" and the distance to the characteristic amount region corresponding to "Non-field Day" is short. The main CPU 11 calculates the probability according to the above distance.

In the step S28, the main CPU 11 makes a decision as to whether or not the processing has been completed for all the image files in the specified cluster. In the case of having performed the calculation of the characteristic amount and that of the probability P of being an event for all the images in the cluster, the main CPU 11 makes a positive decision in the step S28 and causes the flow of control to proceed to a step S29. In the case of not having performed the calculation of the characteristic amount and that of the probability P of being an event for all the images in the cluster, the main CPU 11 makes a negative decision in the step S28 and causes the flow of control to return to the step S23. When the flow of control returns to the step S23, the main CPU 11 specifies another image file among the specified image files constituting the cluster and causes the flow of control to proceed to the step S24.

In the step S29, the main CPU 11 makes a decision as to whether or not the processing has been completed for all the clusters. In the case of having performed the calculation of the characteristic amount and that of the probability P of being an event for all the clusters, the main CPU 11 makes a positive decision in the step S29 and terminates the flow of control of FIG. 4. In the case of not having performed the calculation of the characteristic amount and that of the probability P of being an event for all the clusters, the main CPU 11 makes a negative decision in the step S29 and causes the flow of control to return to the step S21. When the flow of control returns to the step S21, the main CPU 11 specifies another cluster and causes the flow of control to proceed to the step S22.

<Event Decision Processing for Each Cluster>

Figure 5:
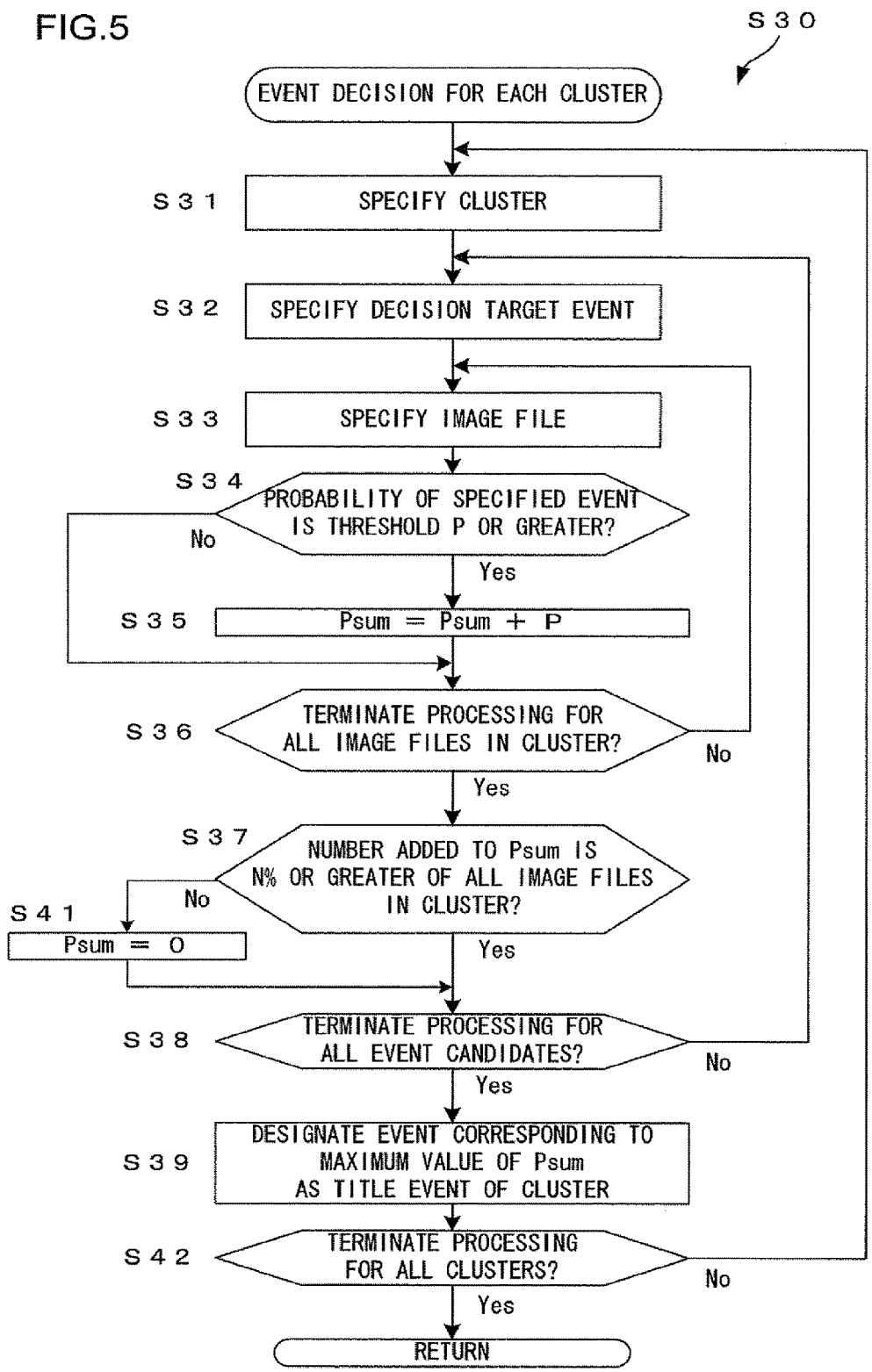
FIG. 5 A flowchart explaining event decision processing for each cluster.

The event decision processing (S30) in terms of cluster will now be explained in detail with reference to the flowchart shown as an example in FIG. 5. In a step S31 of FIG. 5, the main CPU 11 specifies one cluster from among the plurality of clusters and causes the flow of control to proceed to a step S32. The specifying order is, for instance, a chronological order with respect to shooting date and time (priority is given to the cluster having an image file of the earliest shooting time).

In the step S32, the main CPU 11 specifies one event to be a decision target from among the event candidates, and then causes the flow of control to proceed to a step S33. In the step S33, the main CPU 11 specifies one image file from among the image files constituting the cluster specified in the S31 and causes the flow of control to proceed to a step S34. In the step S34, the main CPU 11 makes a decision as to whether or not the probability P of being an event with respect to the event specified in the S32 is equal to or greater than a predetermined decision threshold Pth. If the probability P of being an event is equal to or greater than the decision threshold Pth, the main CPU 11 makes a positive decision in the step S34 and causes the flow of control to proceed to a step S35. If the probability P of being an event is less than the decision threshold Pth, the main CPU 11 makes a negative decision in the step S34 and causes the flow of control to proceed to a step S36.

In the step S35, the main CPU 11 calculates Psum=Psum+P and causes the flow of control to proceed to a step S36. In the step S36, the main CPU 11 makes a decision as to whether or not the processing has been completed with respect to all the image files in the specified cluster. In the case of having performed the processing for all the images in the cluster, the main CPU 11 makes a positive decision in the step S36 and causes the flow of control to proceed to a step S37. In the case of not having performed the processing for all the images in the cluster, the main CPU 11 makes a negative decision in the step S36 and causes the flow of control to return to the step S33. When the flow of control returns to the step S33, the main CPU 11 specifies another image file among the specified image files constituting the cluster and causes the flow of control to proceed to the step S34.

In the step S37, the main CPU 11 makes a decision as to whether or not the number of the probabilities P of being an event, which are added to the above Psum, accounts for equal to or greater than N percent of the number of all the image files in the cluster. If the number of the added Ps accounts for equal to or greater than N percent, the main CPU 11 makes a positive decision in the step S37 and causes the flow of control to proceed to a step S38. If the number of the added Ps accounts for less than N percent, the main CPU 11 makes a negative decision in the step S37, and causes the flow of control to proceed to a step S41. In the step S41, the main CPU 11 sets Psum to be zero (Psum=0) and causes the flow of control to proceed to the step S38.

In the step S38, the main CPU 11 makes a decision as to whether or not the calculation of the Psum has been completed for all the event candidates. If the calculation has been completed for all the events, the main CPU 11 makes as positive decision in the step S38 and causes the flow of control to proceed to a step S39. If the calculation has not been done for all the events, the main CPU 11 makes a negative decision in the step S38 and causes the flow of control to return to the step S32. When the flow of control returns to the step S32, the main CPU 11 specifies another event to be a decision target among the event candidates and causes the flow of control to proceed to the step S33.

In the step S39, the main CPU 11 determines the event candidate having the maximum Psum among the Psums calculated for each event candidate to be the title event of the said cluster and causes the flow of control to proceed to a step S42.

In the step S42, the main CPU 11 makes a decision as to whether or not the calculation of the Psum and the determination of the title event have been completed for all the clusters. In the case of having completed the processing for all the clusters, the main CPU 11 makes a positive decision in the step S42 and terminates the flow of control of FIG. 5. In the case of not having completed the processing for all the clusters, the main CPU 11 makes a negative decision in the step S42 and causes the flow of control to return to the step S31. When the flow of control returns to the step S31, the main CPU 11 specifies another cluster and causes the flow of control to proceed to the step S32.

Figure 9:
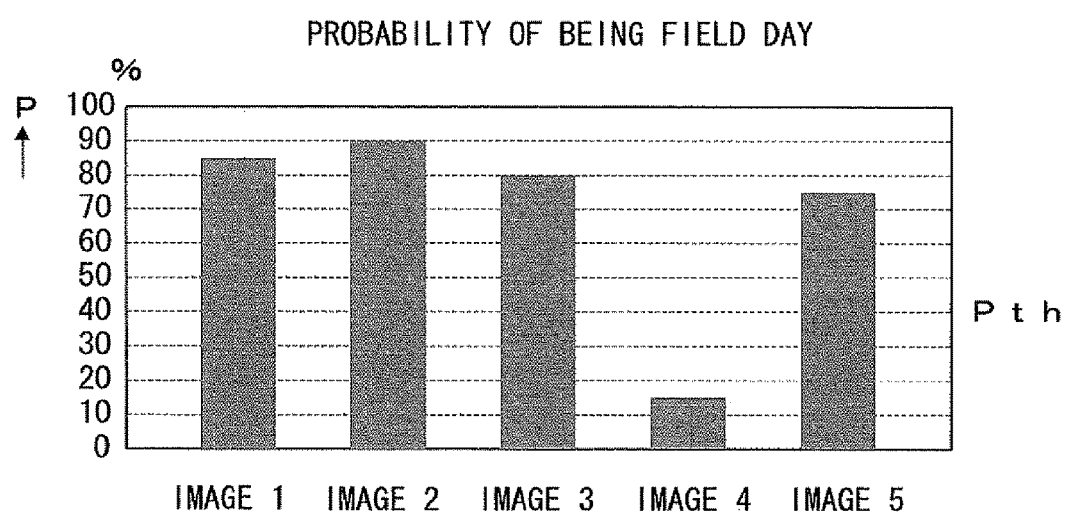
FIG. 9 A figure showing an example of an event decision (field day) for clusters.
Figure 10:
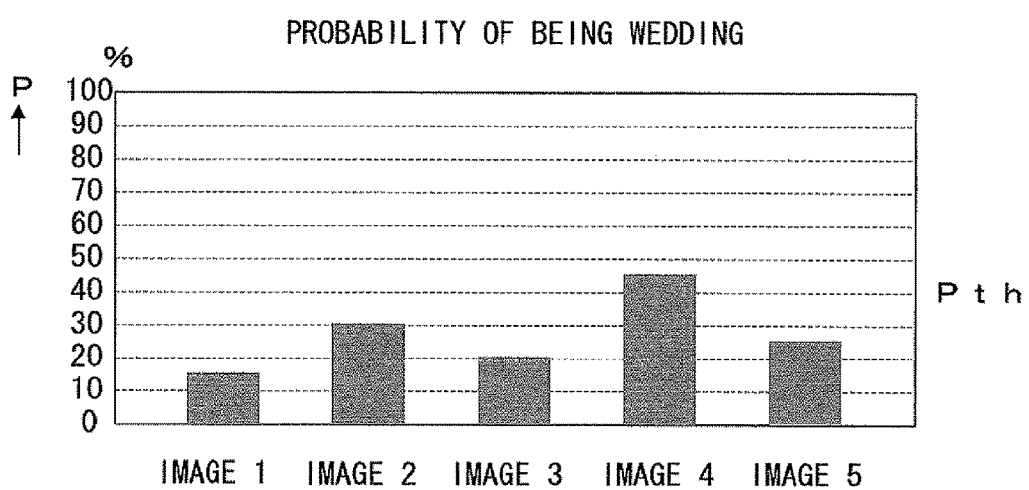
FIG. 10 A figure showing an example of an event decision (wedding) for clusters.
Figure 11:
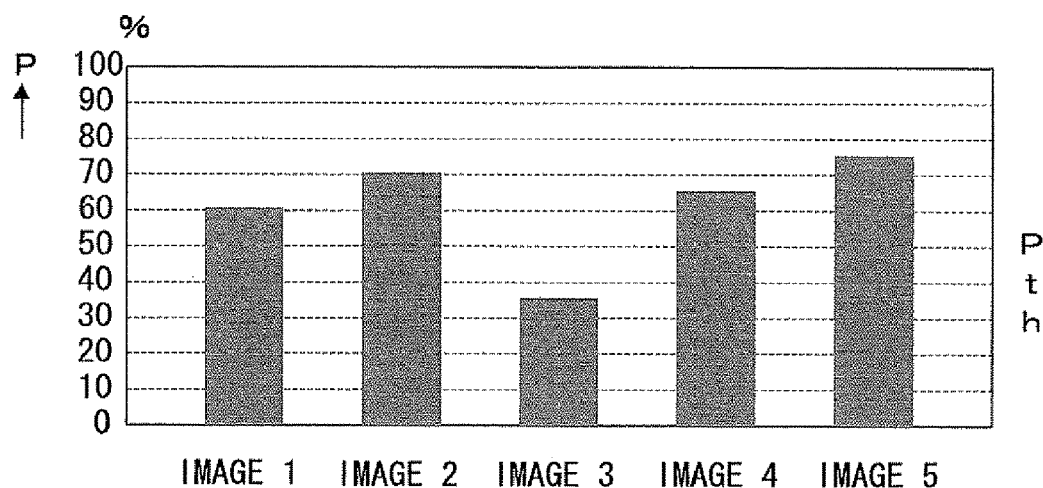

FIGS. 9 to 11 show examples of event decision for clusters including a set of image files (the number of images=5). The event candidates are, for instance, "Field Day", "Wedding", and "Cherry Blossom Viewing", and accordingly the probabilities P of being "Field Day", "Wedding", and "Cherry Blossom Viewing" are calculated respectively for each of the image 1 to image 5. The present example assumes that the decision threshold Pth=40 percent and that the decision threshold N=40 percent.

In the case of FIG. 9, the Psum for the probability of being "Field Day" is obtained by adding each P of the images in which the probability P of being "Field Day" is equal to or greater than the decision threshold Pth (i.e., image 1, image 2, image 3, and image 5) (step S35). In this case, the Psum is calculated as follows: 85 (image 1)+90 (image 2)+80 (image 3)+75 (image 5)=330.

In the case of FIG. 10, the image 4 is the only image in which the probability P of being "Wedding" becomes equal to or greater than the decision threshold Pth. Therefore, only the P calculated for the image 4 is to be added to obtain the probability Psum of being "Wedding". As a result, the Psum=45 (image 4) is obtained. Here, the image 4 (one image) accounts for 20 percent of the total number of images (five), that is, it falls below the above N (40 percent). The main CPU 11 therefore makes a decision that the Psum in the case of FIG. 10 is zero (step S41).

In FIG. 11, the Psum for the probability of being "Cherry Blossom Viewing" is obtained by adding each P of the images in which the probability P of being "Cherry Blossom Viewing" is equal to or greater than the decision threshold Pth (i.e., image 1, image 2, image 4, and image 5) (step S35). In this case, the Psum is calculated as follows: 60 (image 1)+70 (image 2)+65 (image 4)+75 (image 5)=270.

The main CPU 11 designates "Field Day", which corresponds to the maximum Psum, as the title event of the said cluster from among the event candidates ("Field Day", "Wedding", and "Cherry Blossom Viewing").

<Cluster Integration Processing>

The cluster integration processing (S40) will now be explained in detail with reference to the flowchart shown as an example in FIG. 6. In a step S51 of FIG. 6, the main CPU 11 makes a decision as to whether or not the time difference between adjacent clusters among the plurality of clusters is equal to or less than a decision threshold T. If, for example, the difference between the last shooting time in one cluster and the earliest shooting time in the other cluster is equal to or less than the above T, the main CPU 11 makes a positive decision in the step S51 and causes the flow of control to proceed to a step S52. If the time difference exceeds the above T, the main CPU 11 makes a negative decision in the step S51 and terminates the flow of control of FIG. 6. When making a negative decision in the step S51, the main CPU 11 does not perform cluster integration.

In the step S52, the main CPU 11 makes a decision as to whether or not the title events of the adjacent clusters with a time difference equal to or less than T are the same. If the title events are the same, the main CPU 11 makes a positive decision in the step S52 and causes the flow of control to proceed to a step S53. If the title events are not the same, the main CPU 11 makes a negative decision in the step S52 and terminates the flow of control of FIG. 6. When making a negative decision in the step S52, the main CPU 11 does not perform cluster integration.

Figure 6:
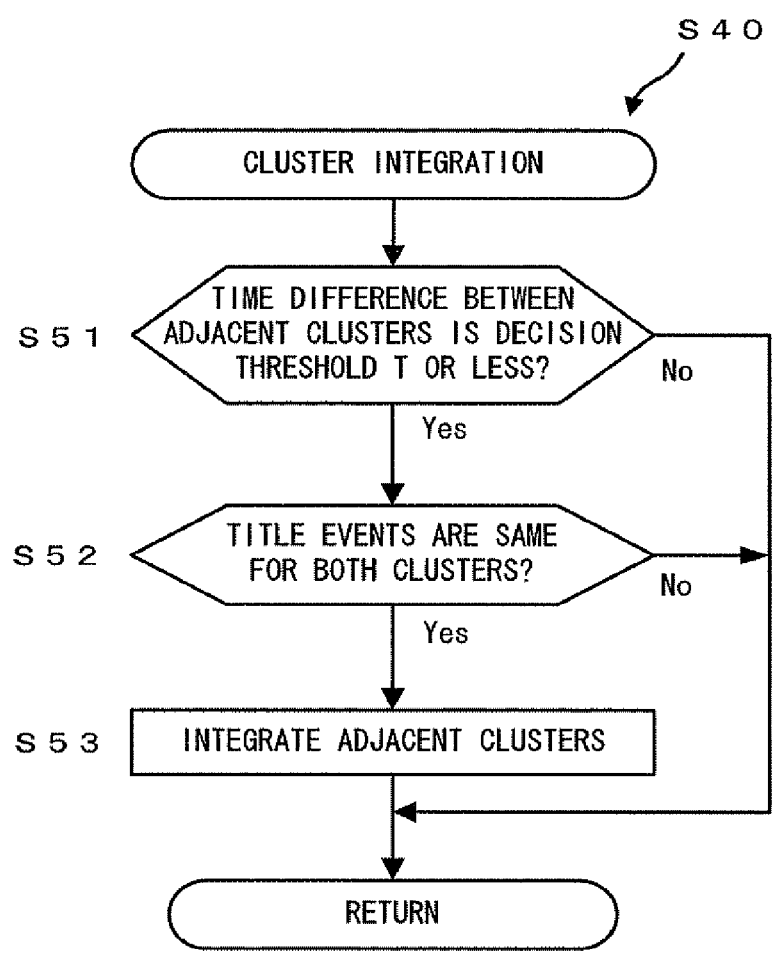
FIG. 6 A flowchart explaining cluster integration processing.

In the step S53, the main CPU 11 integrates the two clusters into one cluster and terminates the flow of control of FIG. 6. The main CPU 11 repeats the cluster integration processing for all the clusters. As a result of the above processing, the number of clusters is reduced.

<Decision Processing of Representative Image for Each Cluster>

Figure 7:
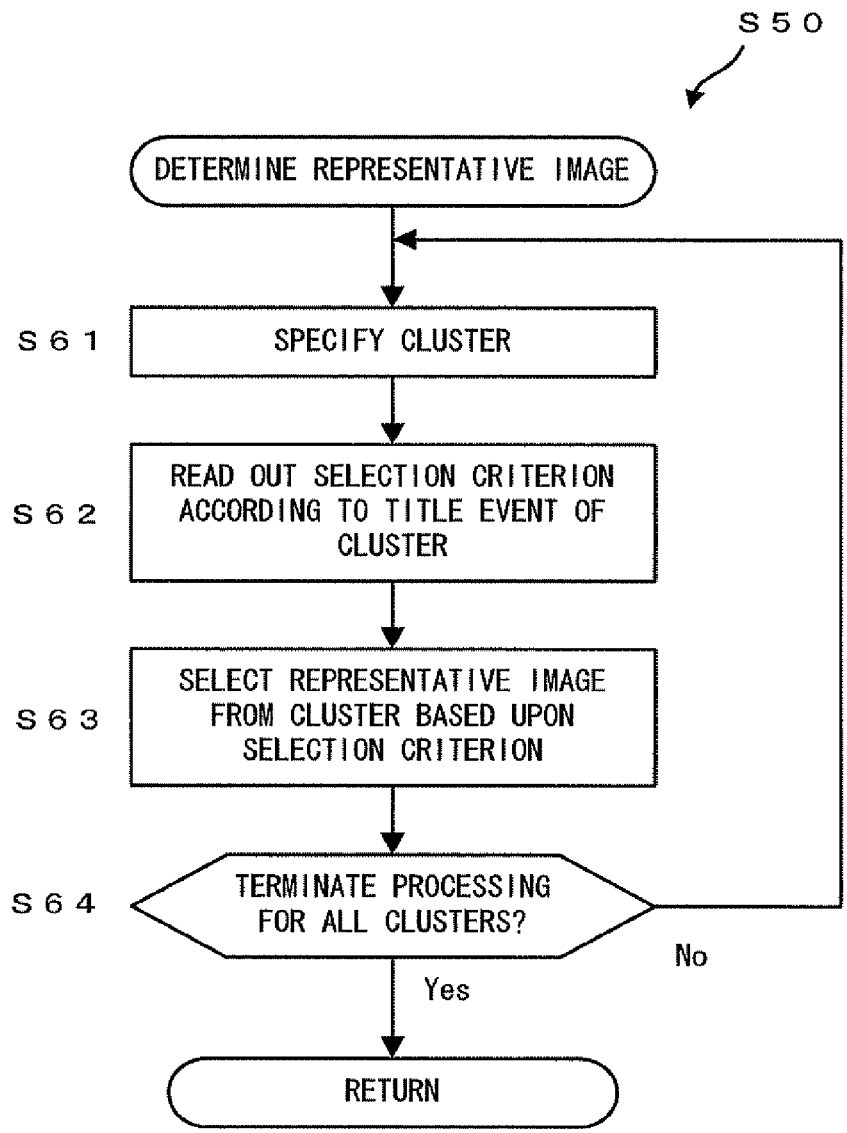
FIG. 7 A flowchart explaining processing to determine a representative image.

The representative image decision processing in terms of cluster will now be explained in detail with reference to the flowchart shown as an example in FIG. 7. In a step S61 of FIG. 7, the main CPU 11 specifies one cluster from among a plurality of clusters and causes the flow of control to proceed to a step S62. The specifying order is, for instance, a chronological order with respect to shooting date and time (priority is given to the cluster having an image file of the earliest shooting time).

In the step S62, the main CPU 11 reads out selection criterion information corresponding to the title event determined in the step S39 from the flash memory 19 and causes the flow of control to proceed to a step S63. The selection criterion information, in which decision method of a representative image is predefined for each title event and tabled, is recorded in the flash memory 19.

In the step S63, based upon the selection criterion information the main CPU 11 selects a representative image from among an image file group included in the cluster and causes the flow of control to proceed to a step S64. In the step S64, the main CPU 11 mikes a decision as to whether or not it has selected representative images for all the clusters. In the case of having completed the processing for all the clusters, the main CPU 11 makes a positive decision in the step S64 and terminates the flow of control of FIG. 7. In the case of not having completed the processing for all the clusters, the main CPU 11 makes a negative decision in the step S64 and causes the flow of control to return to step S61. When the flow of control returns to the step S61, the main CPU 11 specifies another cluster and causes the flow of control to proceed to the step S62.

The selection criterion information will now be explained. With reference to the selection criterion information table shown as an example in FIG. 12, the main CPU 11 selects selection criterion information corresponding to the title event of the cluster. The selection criterion information table is created in advance and recorded in the flash memory 19. If, for instance, the title event of the cluster is "Wedding", "New Year's Shrine Visit", "Doll Festival", "Entrance Ceremony", or "Graduation Ceremony", the main CPU 11 selects an image in which the proportion of the face region included therein is the nearest to a predetermined proportion as a representative image among the images included in the said cluster. It is to be noted that since face detection processing, performed based upon image data, to detect the "face" of a person included in an image is a publicly known technique, an explanation will be curtailed now.

In addition, in the event that the title event of a cluster is "Sea Bathing", "Diving", "Leaf Peeping", or "Golfing", the main CPU 11 selects an image in which the proportion of a predetermined color region included therein is the nearest to a predetermined proportion as a representative image among the images included in the said cluster. The predetermined color region is, for instance, a blue region (Sea Bathing and Diving), a red or a yellow region (Leaf Peeping), or a green region (Golfing).

In addition, it may also be arranged that the main CPU 11 selects an image in which the probability P of being an event corresponding to the title event of the said cluster becomes the greatest as a representative image among the images included in the cluster. In this manner, a representative image decision condition is determined for each title event in advance, and an image representing the title event is determined based upon the decision condition.

According to the first embodiment explained above, the following operations and advantageous effects can be achieved.

(1) It is arranged that a plurality of event candidates (field day, wedding, and cherry blossom viewing) are assigned to a cluster (set of image files), a characteristic amount appropriate to make a decision as to each of the event candidates is calculated for each image in the cluster, and, based upon the characteristic amount of the calculated individual images, the event representing the said cluster (set of image files) is determined from among the event candidates. Unlike the conventional technologies, since a simple addition to calculate the sum Psum of the probabilities P of being an event for each image, a count of the number of the images added to the sum Psum, a magnitude comparison of the Psums between the event candidates, and a magnitude comparison between the decision threshold Pth and the probability P are all that required without applying the SVM method to the cluster, i.e., without the need to calculate the characteristic amount of the cluster, the processing can be carried out in a shorter period of time compared to the case in which the characteristic amount of the image group is calculated.

(2) Since it is arranged that the event candidate having the maximum value of the sum Psum of the probability P of being an event for each image is to be determined, an event representing the set of image files can be determined appropriately.

(3) Since it is arranged that the probability P of being an event for each image is not to be added to the sum Psum if it falls below the decision threshold Pth, the extent to which the image with less probability of being the event candidate affects the sum Psum can be reduced.

(4) It is arranged that the Psum is made zero so as to exclude the said event candidate in the case where the number of images that satisfy the decision threshold Pth (that is, the number of images in which P is added to the sum Psum) falls below a predetermined proportion to the number of images in the cluster. As a result, an event representing the set of image files can be determined appropriately.

(5) It is arranged that a cluster (set of image files) is prepared by clustering in accordance with the shooting date and time of images. As a result, an event candidate in accordance with the shooting date and time can be assigned.

(6) Since it is arranged that a plurality of event candidates are assigned to the cluster, the most appropriate candidate can be determined from among the plurality of event candidates. It is to be noted that it may also be arranged that a plurality of event candidates are assigned to a single image in place of a set of image files and that the most appropriate candidate is to be determined from among the plurality of event candidates.

(7) Since it is arranged that the plurality of event candidates are assigned based upon the event candidate table created in advance based upon the months in which past events took place, an event candidate with a high matching rate can be assigned.

(8) Since it is arranged that the upper limit of the number of event candidates corresponding to each month in the event candidate table is three, load of processing to calculate the probability P of being an event be reduced more than that in the case of not setting the upper limit of the number of event candidates. It is to be noted that it may also be arranged to allow three or more event candidates corresponding to each month so as to select three high-priority candidates when assigning the event candidates to the cluster.

(9) It is arranged that adjacent clusters are integrated into one if the time difference between the adjacent clusters among the plurality of clusters is equal to or less than the decision threshold T and the title events of the said clusters are the same. As a result, compared to those clustered only by the shooting date and time, clustering in detail more than necessary can be avoided more, thereby cataloging the images as desired.

(10) It is arranged that a positive decision is made in the step S51 if the difference between the last shooting time in one cluster and the earliest shooting time in the other cluster is equal to or less that the above T. Since images of the same event are often captured serially without intervals, it is possible to detect the case in which the title events of the said clusters are highly likely to be the same.

(11) It is arranged that the relation between the event candidate and the characteristic amount to be calculated is tabled in advance and recorded in the flash memory 19. As a result, the characteristic amount of the image appropriate to make a decision as to event candidates can be calculated, so that an event representing the set of image files can be determined appropriately.

(12) it is arranged that, based upon selection criterion information provided corresponding to the title event of the cluster, a representative image is selected from among images included in the said cluster. As a result, the representative image can be determined by using the most appropriate selection criterion for each cluster.

(13) It is arranged that selection criterion information appropriate for each title event is tabled in advance and recorded in the flash memory 19. In the case of different title event, selection criterion is switched with reference to the said selection criterion information table. By tabling the selection criterion information, combinations of the title event and the selection criterion can be arbitrarily set.

(Variation 1)

It may also be arranged that clustering is performed in terms of shooting date.

(Variation 2)

It may also be arranged that clustering is performed not in accordance with shooting date and time information but in accordance with shooting position information. More specifically, in the step S11 (FIG. 3), the main CPU 11 extracts from all the image files positioning information representing the shooting position recorded in the additional information unit of the image file. Then, in the step S13 (FIG. 3), with one cluster as a starting point of processing for each image, the main CPU 11 groups image files into a plurality of clusters (sets of image files with the similar shooting position) by repeating processing to sequentially integrate clusters with the similar shooting position. In the event that the interval (distance) between the shooting positions in adjacent clusters is equal to or greater than a predetermined distance (for instance, 1 Km), the main CPU 11 causes the flow of control to proceed to the step S14.

(Variation 3)

It may also be arranged that the event candidate table shown as an example in FIG. 8 can be modified by a user operation. For instance, the user operates the operation members 17 with an edit screen of the event candidate table being displayed on the LCD monitor 16 so as to modify the table content. The modification content is recorded in the flash memory 19. It is to be noted that the number of event candidates assigned to each month is as described above, preferably and normally limited to a predetermined number (for instance, three).

(Variation 4)

Figure 4:
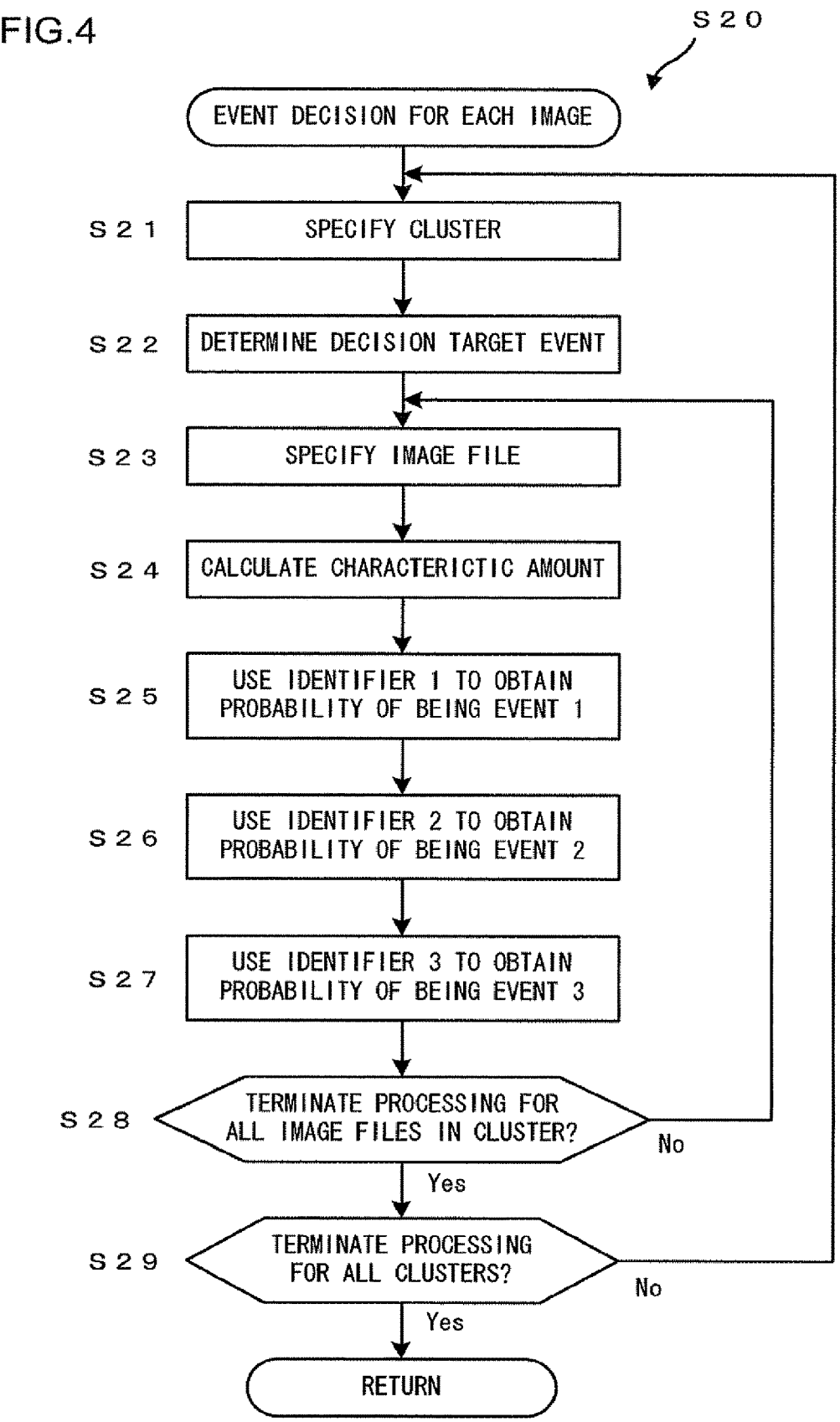
FIG. 4 A flowchart explaining event decision processing for each image.

It may also be arranged that the step S22 of FIG. 4 is skipped. In this case, all the event candidates included in the system are selected without reference to the event candidate table.

(Variation 5)

It is preferable that, in the event candidate table in the case of variation 2, event candidates are arranged to correspond to, for example, each area including the shooting position. For instance, an event such as sea bathing, watermelon splitting, surfing, or diving is selected if the area is near the sea. An event such as camping or hiking is selected if the area is near the mountain. The event candidate table in this case, including events that take place frequently in each area, is created in advance based upon the areas in which past events took place and recorded in the flash memory 19.

(Variation 6)

It may also be arranged that event candidates are assigned in accordance with shooting time. In this case, for example, "New Year's Party", "Year End Party", "Banquet", and the like are included in the event candidate in which images are captured after 18 o'clock. On the other hand, the event candidate does not include those do not take place after 18 o'clock based upon the time in which past events took place such as "Field Day", "Golfing", "Excursion", "Diving", and the like. By reducing the number of event candidates, load of processing to calculate the probability P of being an event for each image can be reduced.

(Variation 7)

It may also be arranged that the title event of the cluster (set of image files) is determine in accordance with the number of images in which the probability P of being an event exceeds the decision threshold Pth. For example, among event candidates ("Field Day", "Wedding", and "Cherry Blossom Viewing"), the event candidate corresponding to the one including the greatest number of images exceeding the decision threshold Pth is determined to be the title event of the said cluster.

(Variation 8)

In addition, the determination method to determine the event candidate including the greatest number of images in which the probability P of being an event exceeds the decision threshold Pth to be the title event and the determination method to determine the event candidate corresponding to the maximum Psum to be the title event may be combined. In this case, if the title event of the cluster can not be determined using one of the determination method, a decision is made using the other determination method. For example, in the examples of FIG. 9 to FIG. 11, the numbers of images in which the probability P of being an event exceeds the decision threshold Pth are the same in the event candidates "Field Day" and "Cherry Blossom Viewing" and accordingly the title event of the cluster can not be determined. Therefore, the event candidate "Field Day" corresponding to the maximum Psum is determined to be the title event of the said cluster.

(Variation 9)

When a decision is made as to whether or not the time difference between adjacent clusters is equal to or less than the decision threshold T, a decision may also be made based upon the time difference corresponding to the centroid of each cluster. In this case, if the difference between the average shooting time of the image group belonging to one cluster and that of the image group belonging to the other cluster is equal to or less than the above T, the main CPU 11 makes in the step S51 (FIG. 6) a positive decision in the step S51 and causes the flow of control to proceed to the step S52.

(Variation 10)

In the case of variation 2 and variation 5, a decision is made as to whether or not the distance between adjacent clusters is equal to or less than the decision threshold D. In this case, if the shortest distance of those between shooting positions of the image group belonging to one cluster and shooting positions of the image group belonging to the other cluster is equal to or less than the above D, the main CPU 11 makes in the step S51 (FIG. 6) a positive decision in the step S51 and causes the flow of control to proceed to step S52. Since images of the same event are often captured serially in the same area, it is possible to detect the case in which the title events of the said clusters are highly likely to be the same.

According to variation 10, among the plurality of clusters, adjacent clusters are integrated into one if the difference in distance between the adjacent clusters is equal to or less than the decision threshold D and the title events of the said clusters are the same. As a result, compared to those clustered only by the shooting position, clustering in detail more than necessary can be avoided more, thereby cataloging the images as desired.

(Variation 11)

Figure 13:
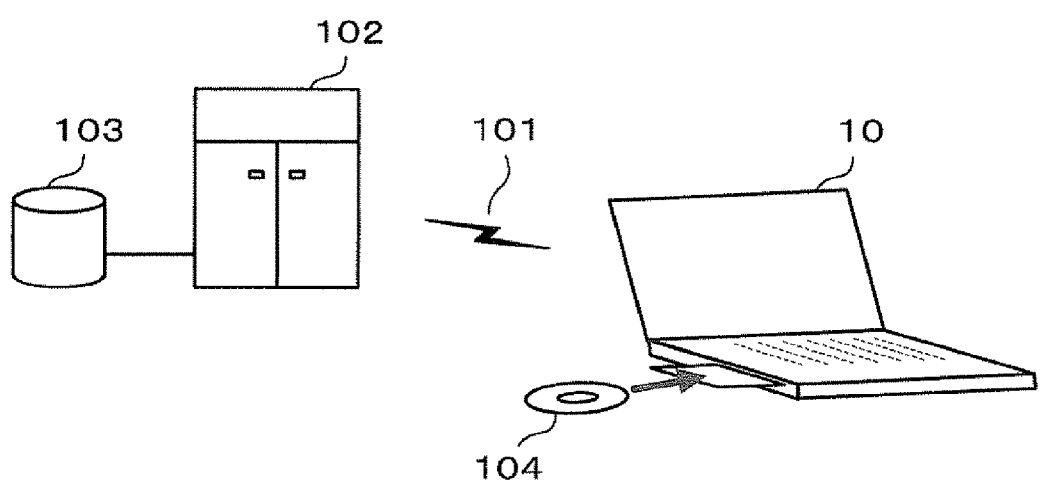
FIG. 13 A figure showing an example of a computer device.

While the example in which images are grouped in the electronic camera 1 and their titles are assigned has been explained, an image title assigning device may also be arranged by causing a computer device 10 shown in FIG. 13 to execute a title assigning program to perform the processing shown in FIG. 2 to FIG. 7. In order to use the title assigning program loaded into the personal computer 10, the program is loaded into a data storage device of the personal computer 10 and the said program is executed so as to use the personal computer 10 as an image group title assigning device.

The load of the program into the personal computer 10 may be performed using a recording medium 104, such as a CD-ROM in which the program is stored, being set to the personal computer 10 or may be performed via a communication line 101 such as a network. If the load is performed via the communication line 101, the program is to be stored in a hard disk device 103 or the like of a server (computer) 102 connected to the communication line 101. The title assigning program can be supplied as a computer program product in a variety of forms such as via the recording medium 104 or the communication line 101.

In addition, it may also be arranged that the program is executed by the server side in a form as the ASP (Application Service Provider).

(Variation 12)

It may also be arranged that a multidimensional event candidate table is provided by combining at least two of the conditions according to which the event candidate is assigned, i.e., the shooting date and time information, the shooting position information, the shooting condition, and the presence or absence of a specific subject, which are described above.

(Variation 13)

It may also be arranged that the selection criterion information table can be modified by a user operation. For instance, the user operates the operation members 17 with an edit screen of the selection criterion information table being displayed on the LCD monitor 16 so as to modify the table content. The modification content is recorded in the flash memory 19.

Second Embodiment

It may also be arranged that clustering processing (S10) is performed not in accordance with shooting date and time information but in accordance with shooting position information. More specifically, in the step S11 (FIG. 3), the main CPU 11 extracts from all the image files positioning information representing the shooting position recorded in the additional information unit of the image file. Then, in the step S13 (FIG. 3), with one cluster as a starting point of processing for each image, the main CPU 11 groups image files into a plurality of clusters (sets of image files with the similar shooting position) by repeating processing to sequentially integrate clusters with the similar shooting position. If the interval (distance) between the shooting positions in adjacent clusters is equal to or greater than a predetermined distance (for instance, 1 Km), the main CPU 11 causes the flow of control to proceed to the step S14.

In the event candidate table in the case of the second embodiment, event candidates are arranged to correspond to each area including the shooting position. FIG. 14 shows an example of the event candidate table referred to in the second embodiment. For instance, in the case of Kanto region, a plurality of event candidates are arranged to correspond to each of Tokyo Metropolis, Kanagawa Prefecture, Chiba Prefecture, Saitama Prefecture, Gunma Prefecture, Ibaraki Prefecture, and Tochigi Prefecture. The event candidates include the names of the area, places of interest, parks, theme parks, landmarks, and the like. With reference to the event candidate table, the main CPU 11 selects an event corresponding to the area (Metropolis or Prefectures) indicated by the shooting position information of an image file constituting the cluster. For instance, if the image file is captured in Chiba Prefecture, the main CPU 11 renders "Disney Resort", "Narita International Airport", "Mother Farm (registered trademark)", and the like event candidates. The event candidate table, including events that take place frequently in each area, is created in advance based upon the places in which past events took place and recorded in the flash memory 19. In addition, the number of event candidates arranged to correspond to each of the areas (in the present example, Metropolis and Prefectures) is limited to a predetermined number (in the present example, three).

The main CPU 11 makes a decision as to whether or not the distance between adjacent clusters is equal to or less than the decision threshold D. More specifically, if the shortest distance of those between shooting positions of the image group belonging to one cluster and shooting positions of the image group belonging to the other cluster is equal to or less than the above D, the main CPU 11 makes in the step S51 (FIG. 6) a positive decision in the step S51 and causes the flow of control to proceed to step S52. Since images of the same event are often captured serially in the same area, it is possible to detect the case in which the title events of the said clusters are highly likely to be the same.

According to the second embodiment explained above, among the plurality of clusters, adjacent clusters are integrated into one if the difference in distance between the adjacent clusters is equal to or less than the decision threshold D and the title events of the said clusters are the same. As a result, compared to those clustered only by the shooting position, clustering in detail more than necessary can be avoided more, thereby cataloging the images as desired.

In addition, since it is arranged that the plurality of event candidates are assigned based upon the event candidate table created in advance based upon the places in which past events took place, an event candidate with a high matching rate can be assigned.

Furthermore, in the same manner as the first embodiment, since it is arranged that the upper limit of the number of event candidates corresponding to each area in the event candidate table is three, load of processing to calculate the probability P of being an event be reduced more than that in the case of not selling the upper limit of the number of event candidates.

(Variation 14)

It may also be arranged that event candidates are assigned in accordance with shooting condition in place of shooting date and time information and shooting position information. In this case, an event candidate table in which event candidates are arranged to correspond to each shooting condition is provided. For instance, shooting conditions (shutter speed, aperture, focus control information, flash firing or not firing, color temperature adjustment factor, and the like) having been stored in additional information data are used so that "Car Racing", "Motorcycle Speedway", "Sport Competition", and the like are included in the event candidates in the case where the shutter speed is higher than a predetermined value. In addition, "Wedding", "Christmas", "Banquet", and the like are included in the event candidates in the case where flash was fired. On the other hand, those events that were photographed without flash firing when they took place, such as "Skiing", "Cherry Blossom Viewing", "Excursion", and "Sea Bathing", are not included in the event candidates. By reducing the number of event candidates, load of processing to calculate the probability P of being an event for each image can be reduced.

(Variation 15)

It may also be arranged that an event candidate is assigned in accordance with the presence or absence of a specific subject in the image. For example, face detection processing is performed based upon the image data, and if the "face" of the person is included in the image, "New Year's Party", "Graduation Ceremony", "Entrance Ceremony", "Year End Party", and the like are included in the event candidates. On the other hand, those events that do not include the "face" on their images captured when they took place, such as "Leaf Peeping", "Diving", and the like, are not included in the event candidates. By reducing the number of event candidates, load of processing to calculate the probability P of being an event for each image can be reduced.

(Variation 16)

In addition, if it is arranged to identify the "face" of a specific person and the "face" of the specific person such as a family member is included in an image, "New Year's Shrine Visit", "Seven-Five-Three Festival" (festival for children of specific ages), "Doll Festival", and the like may preferably be included in the event candidates. In this case, an occasion in which the family member does not participate is not included in the event candidates. By reducing the number of event candidates, load of processing to calculate the probability P of being an event for each image can be reduced. It is to be noted that since face identification processing to identify the "face" of a person included in an image is a publicly known technique, an explanation will be curtailed now.

(Variation 17)

Furthermore, it may also be arranged to make a decision as to whether or not the "face" of the person is that of an adult or that of a child and that of a male or that of a female and to include event candidates matching each event or exclude those not matching each event. By reducing the number of event candidates, load of processing to calculate the probability P of being an event for each image can be reduced.

(Variation 18)

It is to be noted that it may also be arranged that a multidimensional event candidate table is provided by combining at least two of the following conditions according to which the event candidate is assigned, i.e., the shooting date and time information, the shooting position information, the shooting condition, and the presence or absence of a specific subject, which are explained above.

Third Embodiment

In place of the selection criterion information table shown as an example in FIG. 12, the selection criterion information table shown as an example in FIG. 15 may be referred to. The selection criterion information table of FIG. 15 is, in the same manner as the table according to the first embodiment, created in advance and recorded in the flash memory 19. For example, if the title event of a cluster is "Trip to Hokkaido", the main CPU 11 selects an image in which the shooting position information is the nearest to position information corresponding to the said area (for instance, places of interest in Hokkaido) as a representative image.

More specifically, the position information related to the name of the area included in the title event is recorded in the flash memory 19 in advance. For instance, if "Hokkaido" is included in the title event, the main CPU 11 reads out position information corresponding to places of interest (for example, Sarobetsu Mire) of "Hokkaido" from the flash memory 19. In addition, the main CPU 11 makes a decision as to whether or not position information of the shooting point is recorded in additional information data of each image file of all the image files included in the cluster, and, if the position information of the shooting point is recorded, obtains the position information from the said image file.

Then, based upon the position information read out from the flash memory 19 and the position information obtained from the image file in the cluster, the main CPU 11 makes a decision as to whether or not each of the images has been captured in any of the places of interest. As a result of comparison, the main CPU 11 selects the image in which the distance between the both position information is the shortest as a representative image of the cluster.

In addition, if the title event of a cluster is "Diving" or "Sea Bathing", the main CPU 11 selects "the image in which the sea is photographed", i.e., the image in which the proportion of a specific color region (in this case, the sea) in the image is the nearest to a predetermined proportion as a representative image. More specifically, color information related to the title event is recorded in the flash memory 19 in advance. For instance, if characters associated with "Sea" are included in the title event, the main CPU 11 reads out information showing a specific color (for example, cobalt blue) from the flash memory 19.

In addition, the main CPU 11 obtains color information from image data of each image file of all the image files included in the cluster. For example, the main CPU 11 divides an image into a predetermined number a regions and makes a decision as to whether or not the color of a pixel group positioned at the center of each of the divided regions matches the specific color. Then, the main CPU 11 obtains the proportion of the above predetermined number and the number of the divided regions matching the specific color. The proportion of the specific color (the color of the sea) accounting for in an image varies depending upon the scene, such as a shooting scene on a ship, a shooting scene on the beach, a shooting scene in water, or the like. Therefore, the proportion information in accordance with the scene desired to be a representative image is recorded in the flash memory 19 in advance. In this manner, information showing processing necessary to determine a representative image and also information necessary for the said processing are recorded in the flash memory 19.

Furthermore, if the title event of a cluster is "Field Day", the main CPU 11 selects an image in which main subject movement information is greater than a predetermined value as a representative image. More specifically, information that instructs acquisition of subject tracking information is recorded in the flash memory 19 in advance. For instance, if the title event includes characters associated with "Sports" such as "Field Day", the main CPU 11 reads out the information that instructs acquisition of the subject tracking information from the flash memory 19.

In addition, the main CPU 11 makes a decision as to whether or not information related to the subject tracking result in additional information data of each image file of all the image files included in the cluster is recorded, and, tithe information related to the subject tracking result is recorded, obtains the information related to the subject tracking result from the said image file.

Then, based upon the obtained tracking information, the main CPU 11 compares the time series variations in coordinate value of the subject position between each of the images. As the result of the comparison, the main CPU 11 selects the image with the greatest variation in coordinate value of the subject position as a representative image of the cluster.

When providing the user with the folder structure corresponding to each cluster, the main CPU 11 causes the LCD monitor 16 to display a thumbnail image of a representative image, for example, arranged on a folder icon.

More specifically, the main CPU 11 causes a thumbnail image of the representative image in which places of interest are captured to be displayed on the folder icon of the title event of "Trip to Hokkaido". In addition, the main CPU 11 causes a thumbnail image of the representative image in which an area in cobalt blue accounts for a predetermined proportion of the captured image to be displayed on the folder icon of the title event of "Sea Bathing". Furthermore, the main CPU 11 causes a thumbnail image of the representative image in which the main subject with great movement is captured to be displayed on the folder icon of the title event of "Field Day".

According to the third embodiment explained above, the following operations and advantageous effects can be achieved.

(1) It is arranged that, if the title event includes the name of an area XXX such as "Trip to XXX", an image having shooting position information that is the nearest to a predetermined point (for example, a place of interest or the like) in the area is selected as a representative image. Since in general a place of interest is known to represent an area, a preferred image as a representative of a plurality of images constituting a cluster can be determined.

(2) It is arranged that, if the title event is associated with a specific color such as "Sea Bathing", an image in which the subject region of the color in the image accounts for a predetermined proportion is selected as a representative image. Since in general cobalt blue is known to represent the color of the sea, if cobalt blue is associated with "Sea Bathing" in advance, a preferred image as a representative of a plurality of images constituting a cluster can be determined.

(3) It is arranged that, in the event that the title event includes a moving subject such as "Field Day", an image with a great variation in coordinate indicating the subject position is selected as a representative image. Since in general a field day is known as an event with many moving scenes such as a foot race, a preferred image as a representative of as plurality of images constituting a cluster can be determined.

(Variation 19)

It may also be arranged to record position information on a plurality of places of interest (for instance, Sarobetsu Mire and Rishiri Island) in the flash memory 19 in advance and to prioritize the places of interest (for example, (1) Rishiri Island and (2) Sarobetsu Mire), in place of selecting an image with the shortest distance from a place of interest as a representative image based upon shooting position information. In the event that images captured at a plurality of different places of interest are included among images constituting the cluster, the image having position information corresponding to the place of interest with the highest priority (for example, Rishiri Island) is selected as a representative image from among images captured within a predetermined distance (for instance, 500 m) from the places of interest. As a result, a representative image according to user preferences can be determined in the case where captured images for a plurality of places of interest are included.

(Variation 20)

If the title event of the cluster is "Diving" or "Sea Bathing", an image in which the proportion of the sea thereof is a predetermined value and the focal length of the taking lens at the time of shooting is shorter than a predetermined value may also be selected as a representative image. Information of shooting condition stored as additional information data of the said image file is used for focal length information. As a result, a representative image with a wide picture angle can be selected.

Fourth Embodiment

Figure 16:
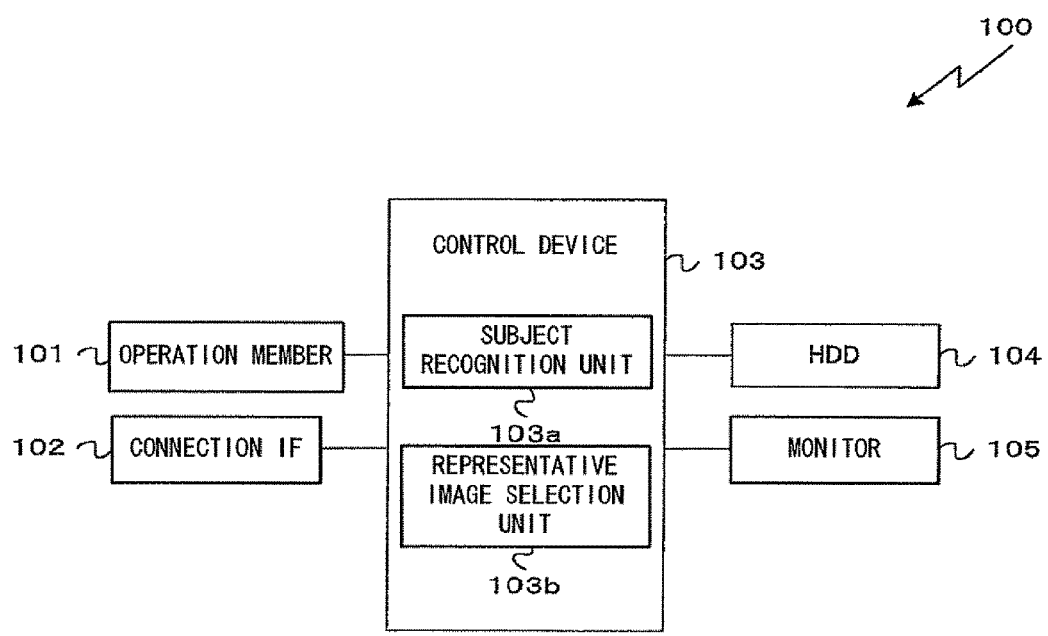
FIG. 16 A block diagram showing the structure of the image display device according to the fourth embodiment.

FIG. 16 is a block diagram showing the structure of an embodiment of the image display device of the present embodiment. An image display device 100, for example a personal computer, includes an operation member 101, a connection IF (interface) 102, a control device 103, as HDD (hard disk drive) 104, and a monitor 105.

The operation member 101 includes a variety of devices to be operated by the user, for instance, a keyboard and a mouse. A USB interface to allow wired connection with, for instance, a digital camera or a video camera, a wireless LAN module to allow wireless connection, or the like is mounted as the connection IF 102, which is an interface to connect an external device such as a digital camera. In the present embodiment, an image file is loaded from the digital camera through the connection IF 102. The monitor 105, for example a liquid crystal monitor, displays data to be displayed output from the control device 103.

The HDD 104 is a recording device to record image files loaded through the connection IF 102, a variety of programs executed by the control device 103, and the like. In the present embodiment, it is assumed that image files loaded through the connection IF 102 have been classified according to the attributes of the images in advance. It is assumed that, for example, they have been grouped and classified by shooting year, month, and day or grouped and classified by event. It is assumed that they have then been sorted by each group into a folder and recorded in the HDD 104.

Figure 17:
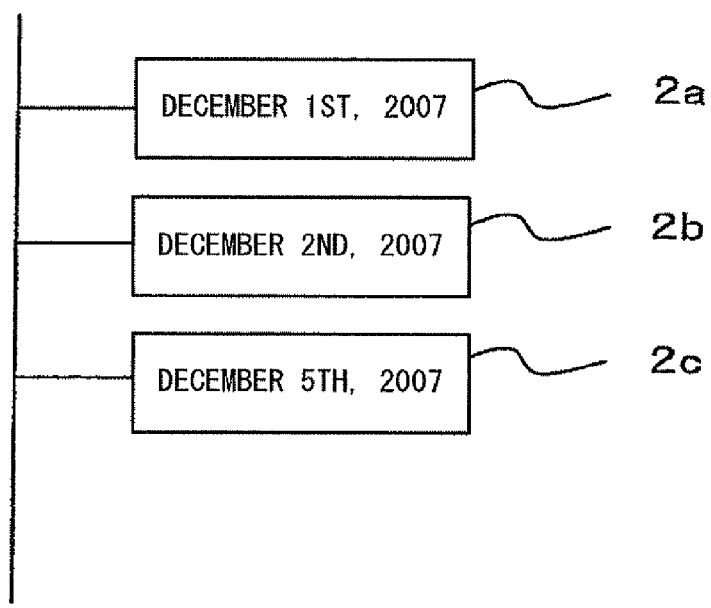
FIG. 17 A schematic illustration of an example of a folder structure.

FIG. 17 is a schematic illustration of an example of the folder structure in the present embodiment. The example shown in FIG. 17 presents a case in which the image files are sorted into folders by shooting year, month, and day. More specifically, FIG. 17 presents an example in which a folder 2*a* in which an image file captured on Dec. 1, 2007 is recorded, a folder 2*b* in which an image file captured on Dec. 2, 2007 is recorded, and a folder 2*c* in which an image file captured on Dec. 5, 2007 is recorded are created in the HDD 104.

The control device 103, being constituted with a CPU, a memory, and other peripheral circuits, functionally includes a subject recognition unit 103*a* and a representative image selection unit 103*b*. It is to be noted that the memory constituting the control device 103 includes an SDRAM and a flash memory. An SDRAM is a volatile memory that is used as a work memory so that the CPU develops a program when executing the program or used as a buffer memory in which data is temporarily recorded. The flash memory is a non volatile memory in which data of the program to be executed by the control device 103, a variety of parameters to be read when the program is executed, and the like are recorded.

Figure 18:
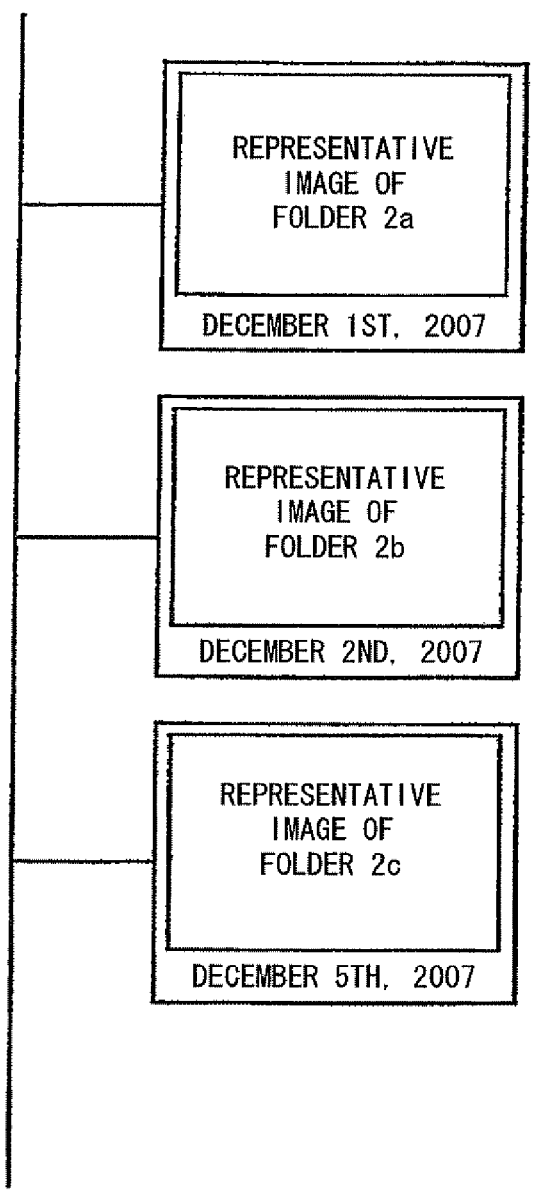
FIG. 18 An illustration of an example of a folder structure using representative images.

In the present embodiment, when presenting the folder structure created in the HDD 104 as described above to the user, the control device 103 causes a representative image selected from among image files (hereinafter referred to as "images") recorded in each of the folders to be associated with the folder and to be displayed. For instance, when providing the user with the folder structure shown in FIG. 17, the control device 103 causes a thumbnail image of the representative to be arranged on the folder icon as shown in FIG. 18 and to be displayed. In order to do so, the subject recognition unit 103a and the representative image selection unit 103b carry out the processing shown in flowcharts of FIG. 19 to FIG. 21.

Figure 19:
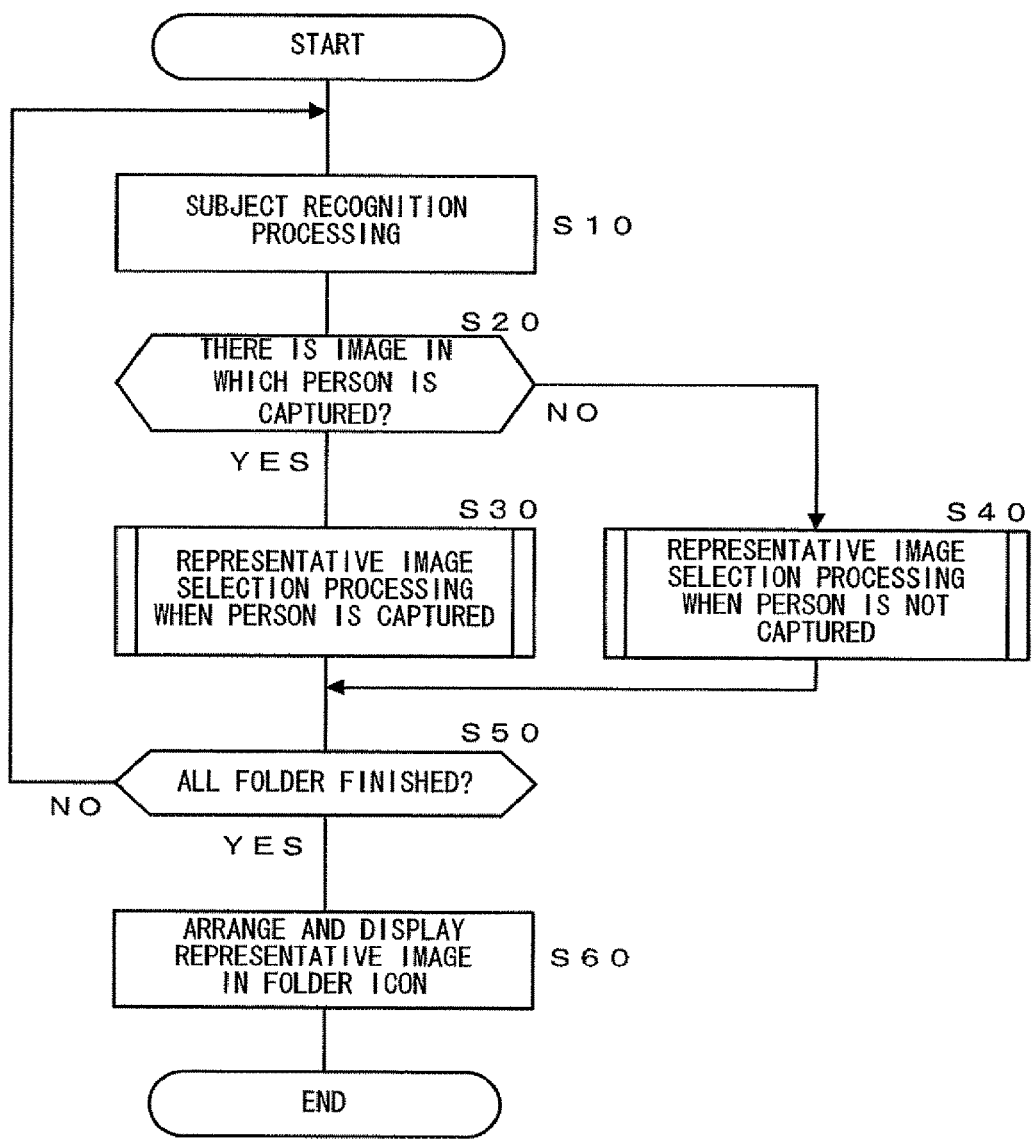
FIG. 19 A flowchart showing processing of the image display device.

It is to be noted that the processing shown in FIG. 19 is carried out by the control device 103 as a program that runs when display of a folder list on the monitor 105 is instructed by the user operating the operation member 101.

In a step S10, the subject recognition unit 103a carries out publicly known subject recognition processing for all the images recorded in any one of the folders in the HDD 104. As the result, the subject recognition unit 103a can recognize what has been captured as the subject for each image recorded in the target folder. It is to be noted that if the face of a person is captured in an image, the coordinate value of the face outline in the image is specified in the publicly known subject recognition processing. In addition, whether or not the face of the person is facing the front or how many degrees it turns away from the front is also detected. The subject recognition unit 103a records coordinate value information of the face outline and information related to the face direction in a RAM.

After that, the control device 103 causes the flow of control to proceed to a step S20, in which, as the result of the subject recognition processing performed in the step S10, the representative image selection unit 103b makes a decision as to whether or not an image with a person captured as the subject therein has been included in the target folder. If the representative image selection unit 103b makes a positive decision, the control device 103 causes the flow of control to proceed to a step S30, in which the representative image selection unit 103b carries out "representative image selection processing in the case of a person photographed" shown in FIG. 20 and selects a representative image from among images recorded in the target folder, and the control device 103 causes the flow of control to proceed to a step S50. On the other hand, if the representative image selection unit 103b makes a negative decision, the control device 103 causes the flow of control to proceed to a step S40. In the step S40, the representative image selection unit 103b carries out "representative image selection processing in the case of a person not photographed" shown in FIG. 21 and selects a representative image from among images recorded in the target folder, and the control device 103 causes the flow of control to proceed to the step S50.

In other words, based upon the result of the subject recognition by the subject recognition unit 103a, the representative image selection unit 103b changes the processing to select the representative image. Here, the processing shown in FIG. 20 and FIG. 21 have, as described later, different selection criteria to select the representative image. Therefore, in other words, based upon the result of the subject recognition by the subject recognition unit 103a, the representative image selection unit 103b sets selection criteria to select the representative image.

In the step S50, the representative image selection unit 103b makes a decision as to whether or not the execution of the processing from the step S10 to the step S40 has been completed for all the folders recorded in the HDD 104. If the representative image selection unit 103b makes a negative decision, the control device 103 causes the flow of control to return to the step S10, in which the representative image selection unit 103b designates another folder as a new target folder and repeats the processing. On the other hand, in the event that the representative image selection unit 103b makes a positive decision, the control device 103 causes the flow of control to proceed to a step S60. In the step S60, the representative image selection unit 103b displays, as shown in FIG. 18, the selected representative image arranged in the folder icon, and the control device 103 terminates the flow of control.

Figure 20:
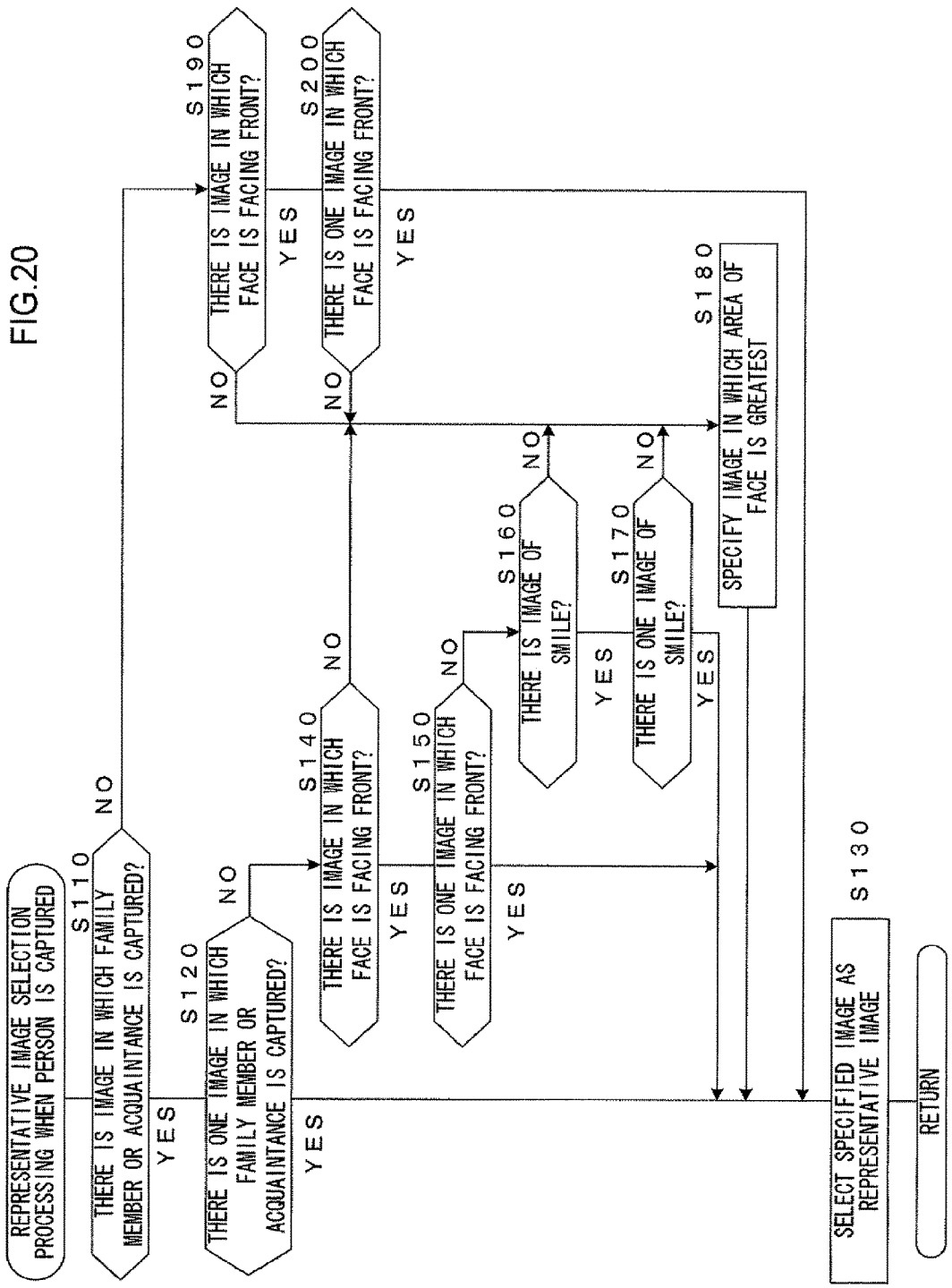
FIG. 20 A flowchart showing the flow of "representative image selection processing in the event that a person is photographed".

FIG. 20 is a flowchart showing the flow of the "representative image selection processing in the case of a person photographed" carried out in the step S30 of FIG. 19. In a step S110, the representative image selection unit 103b makes a decision as to whether or not an image in which a family member or an acquaintance is captured has been included in the target folder. More specifically, an face image of a family member or an acquaintance is captured and recorded in the HDD 104 in advance, and then, the representative image selection unit 103b performs processing to match the face image recorded in the HDD 104 to the image in which the person is captured in the target folder so as to makes a decision as to whether or not the face in the image is the face of the family member or the acquaintance.

If the representative image selection unit 103b makes a positive decision in the step S110, the control device 103 causes the flow of control to proceed to a step S120, in which the representative image selection unit 103b makes a decision as to whether or not only as single image in which the family member or the acquaintance is captured has been included in the target folder. If the representative image selection unit 103b makes a positive decision, the control device 103 causes the flow of control to proceed to a step S130, in which the representative image selection unit 103b selects the single image specified as an image in which the family member or the acquaintance is captured in the decision processing of the step S120 as a representative image, and causes the flow of control to return to the processing shown in FIG. 19.

On the other hand, if the representative image selection unit 103b makes a negative decision in the step S120, i.e., if the representative image selection unit 103b makes a decision that a plurality of images in which the family member or the acquaintance is captured have been included in the target folder, the control device 103 causes the flow of control to proceed to a step S140. In the step S140, the representative image selection unit 103b makes a decision as to whether or not an image in which a face is facing the front has been included among the images in which the family member or the acquaintance is captured. More specifically, based upon information related to the direction of the face detected and recorded in the RAM by the subject recognition unit 103a in the step S10 of FIG. 19, the representative image selection unit 103b makes a decision that the face is facing the front when the direction of the face is at zero degrees or when it is within a predetermined range from zero degrees, for example, 10 degrees or less right and left.

If the representative image selection unit 103b makes a negative decision in the step S140, the control device 103 causes the flow of control to proceed to a step S180, in which the representative image selection unit 103b specifies the image with the greatest area of the face from among the plurality of images in which the family member or the acquaintance is captured. More specifically, based upon the coordinate value information of the face outline detected and recorded in the RAM by the subject recognition unit 103a in the step S10 of FIG. 19, the representative image selection unit 103b specifies the region covered by the face in the image, calculates its area, and, based upon the calculated result, specifies the image in which the area of the face is the greatest. After that, the control device 103 causes the flow of control to proceed to the step S130 described above, in which the representative image selection unit 103b selects the image in which the area of the face is the greatest specified in the step S180 as a representative image, and causes the flow of control to return to the processing shown in FIG. 19.

On the other hand, if the representative image selection unit 103b makes a positive decision in the step S140, the control device 103 causes the flow of control to proceed to a step S150. In the step S150, the representative image selection unit 103b makes a decision as to whether or not only a single image in which a face is facing the front has been included among the images in which the family member or the acquaintance is captured. If the representative image selection unit 103b makes a positive decision, the control device 103 causes the flow of control to proceed to the step S130 described above, in which the representative image selection unit 103b selects the single image specified as an image in which the face is facing the front in the decision processing of the step S150 as a representative image, and causes the flow of control to return to the processing shown in FIG. 19.

On the other hand, if the representative image selection unit 103b makes a negative decision in the step S150, i.e., if the representative image selection unit 103b makes a decision that a plurality of images in which the face is facing the front have been included, the control device 103 causes the flow of control to proceed to a step S160. In the step S160, the representative image selection unit 103b makes a decision as to whether or not an image in which the expression of the face facing the front is smile has been included among the images in which the lace is facing the front. More specifically, the representative image selection unit 103b carries out publicly known expression recognition processing for the plurality of images in which the family member or the acquaintance is captured and the face is facing the front so as to make a decision as to whether or not the face facing the front is a smile.

If the representative image selection unit 103b makes a negative decision in the step S160, the control device 103 causes the flow of control to proceed to the step S180 described above, in which the representative image selection unit 103b specifies the image in which the area of the face is the greatest from among the images in which the family member or the acquaintance is captured and the face is facing the front. After that, the control device 103 causes the flow of control to proceed to the step S130 described above, in which the representative image selection unit 103b selects the image in which the area of the face is the greatest specified in the step S180 as a representative image, and causes the flow of control to return to the processing shown in FIG. 19.

On the other hand, if the representative image selection unit 103b makes a positive decision in the step S160 the control device 103 causes the flow of control to proceed to a step S170, in which the representative image selection unit 103b makes a decision as to whether or not only a single image in which the expression is a smile has been included among the images in which the family member or the acquaintance is captured and the face is facing the front. If the representative image selection unit 103b makes a negative decision, the control device 103 causes the flow of control to proceed to the step S180 described, above, in which the representative image selection unit 103b specifies the image in which the area of the face is the greatest from among the images in which the family member or the acquaintance is captured, the face is facing the front, and the expression is a smile. After that, the control device 103 causes the flow of control to proceed to the step S130 described above, in which the representative image selection unit 103b selects the image in which the area of the face is the greatest specified in the step S180 as a representative image, and causes the flow of control to return to the processing shown in FIG. 19.

On the other hand, if the representative image selection unit 103b makes a positive decision in the step S170, the control device 103 causes the flow of control to proceed to the step S130 described above, in which the representative image selection unit 103b selects the single image specified as an image in which the expression is a smile in the decision processing of the step S170 as a representative image, and causes the flow of control to return to the processing shown in FIG. 19.

Next, the processing when the representative image selection unit 103b makes a negative decision in the step S110, i.e., the processing when an image in which the family member or the acquaintance is captured has not been included in the folder will be explained. In this case, the control device 103 causes the flow of control to proceed to a step S190, in which, based upon the information related to the direction of the face recorded in the RAM, as described above, the representative image selection unit 103b makes a decision as to whether or not an image in which the face is facing the front has been included among the images in which the person is captured.

If the representative image selection unit 103b makes a negative decision, the control device 103 causes the flow of control to proceed to the step S180 described above, in which the representative image selection unit 103b specifies the image in which the area of the face is the greatest from among the image in which a person other than the family member nor the acquaintance is captured. After that, the control device 103 causes the flow of control to proceed to the step S130 described above, in which the representative image selection unit 103b selects the image in which the area of the face is the greatest specified in the step S180 as a representative image, and causes the flow of control to return to the processing shown in FIG. 19.

On the other hand, if the representative image selection unit 103b makes a positive decision in the step S190, the control device 103 causes the flow of control to proceed to a step S200. In the step S200, the representative image selection unit 103b makes a decision as to whether or not only a single image in which the person other than the family member or other than the acquaintance is lacing the front has been included in the target folder. If the representative image selection unit 103b makes a positive decision, the control device 103 causes the flow of control to proceed to the step S130 described above, in which the representative image selection unit 103b selects the single image specified an image in which the face is facing the front in the decision processing of the step S200 as a representative image, and causes the flow of control to return to the processing shown in FIG. 19.

On the other hand, if the representative image selection unit 103b makes a negative decision in the step S200, i.e., if a plurality of images in which the face is facing the front have been included, the control device 103 causes the flow of control to proceed to the step S180 described above, in which the representative image selection unit 103b specifies the image in which the area of the face is the greatest from among the plurality of images in which the person other than the family member nor the acquaintance is captured and the face is facing the front. After that, the control device 103 causes the flow of control to proceed to the step S130 described above, in which the representative image selection unit 103b selects the image in which the area of the face is the greatest specified in the step S180 as a representative image, and causes the flow of control to return to the processing shown in FIG. 19.

FIG. 21 is a flowchart showing the flow of the "representative image selection processing in the case of a person not photographed" carried out in the step S40 of FIG. 19. In a step S210, the representative image selection unit 103b makes a decision as to whether or not an image without blurring has been included in the target folder. More specifically, the representative image selection unit 103b carries out publicly known amount of blur calculation processing for all the images in the target folder so as to calculate an amount of blur for each of the images. Then, the representative image selection unit 103b makes a decision that the image whose calculated amount of blur is equal to or less than a threshold value is an image without blurring.

In the event that the representative image selection unit 103b makes a positive decision in the step S210, the control device 103 causes the flow of control to proceed to a step S220, in which the representative image selection unit 103b makes a decision as to whether or not only a single image without blurring has been included in the target folder. In the event that the representative image selection unit 103b makes a positive decision, the control device 103 causes the flow of control to proceed to a step S230, in which the representative image selection unit 103b selects the single image specified as an image without blurring in the decision processing of the step S220 as a representative image, and causes the flow of control to return to the processing shown in FIG. 19.

On the other hand, in the event that the representative image selection unit 103b makes a negative decision in the step S220, i.e., in the event that the representative image selection unit 103b makes a decision that a plurality of images without blurring have been included in the target folder, the control device 103 causes the flow of control to proceed to a step S240. In the step S240, the representative image selection unit 103b makes a decision as to whether or not an image in which a main subject is focused on has been included among the images without blurring. More specifically, based upon range finding information recorded in the image file, the representative image selection unit 103b specifies the subject existing in a focus area as the main subject. Then, based upon a defocus amount of the photographic optical system recorded in the image file, the representative image selection unit 103b makes a decision as to whether or not the main subject is in focus. It is to be noted that it is assumed that range finding information and the defocus amount of the photographic optical system have been recorded in the image file as additional information, for instance, Exif information.

If the representative image selection unit 103b makes a negative decision in the step S240, the control device 103 causes the how of control to proceed to a step S280, in which the representative image selection unit 103b specifies one image captured in the optimal composition front among the images without blurring. Here, the image captured in the optimal composition refers to an image captured in a method generally said to be the optimal composition, for example, the rule of thirds. In other words, the representative image selection unit 103b specifies an image in which the position of the main subject, which has been specified in the step S240, in the image is the nearest to the optimal subject position in the rule of thirds as the image captured in the optimal composition. After that, the control device 103 causes the flow of control to proceed to the step S230 described above, in which the representative image selection unit 103b selects the image captured in the optimal composition specified in the step S280 as a representative image, and causes the flow of control to return to the processing shown in FIG. 19.

On the other hand, if the representative image selection unit 103b makes a positive decision in the step S240, the control device 103 causes the flow of control to proceed to a the step S250. In the step S250, the representative image selection unit 103b makes a decision as to whether or not only a single image in which the main subject is focused on has been included in the images without blurring. If the representative image selection unit 103b makes a positive decision, the control device 103 causes the flow of control to proceed to the step S230 described above, in which the representative image selection unit 103b selects the single image specified as an image in which the main subject is focused on in the decision processing of the step S250 as a representative image, and causes the flow of control to return to the processing shown in FIG. 19.

On the other hand, if the representative image selection unit 103b makes a negative decision in the step S250, i.e., if the representative image selection unit 103b makes a decision that a plurality of images in which the main subject is focused on have been included, the control device 103 causes the flow of control to proceed to a step S260. In the step S260, the representative image selection unit 103b makes a decision as to whether or not an image with proper brightness has been included among the images in which the main subject is focused on. More specifically, the representative image selection unit 103b creates a histogram representing a distribution of the brightness value for each of the plurality of images without blurring in which the main subject is focused on. Then, based upon the distribution of the brightness value represented by the created histogram, the representative image selection unit 103b makes a decision as to whether or not each of the images has proper brightness.

In the event that the representative image selection unit 103b makes a negative decision in the step S260, the control device 103 causes the flow of control to proceed to the step S280 described above, in which the representative image selection unit 103b specifies an image captured in the optimal composition described above from among the plurality of images without blurring in which the main subject is focused on. After that, the control device 103 causes the flow of control to proceed to the step S230 described above, in which the representative image selection unit 103b selects the image captured in the optimal composition specified in the step S280 as a representative image, and causes the flow of control to return to the processing shown in FIG. 19.

On the other hand, in the event that the representative image selection unit 103b makes a positive decision in the step S260, the control device 103 causes the flow of control to proceed to a step S270, in which the representative image selection unit 103b makes a decision as to whether or not only a single image with proper brightness has been included among the images without blurring in which the main subject is focused on. In the event that the representative image selection unit 103b makes a negative decision, the control device 103 causes the flow of control to proceed to the step S280 described above, in which the representative image selection unit 103b specifies an image captured in the optimal composition from among the images without blurring in which the main subject is focused on having proper brightness. After that, the control device 103 causes the flow of control to proceed to the step S230 described above, in which the representative image selection unit 103b selects the image captured in the optimal composition specified in the step S280 as a representative image, and causes the flow of control to return to the processing shown in FIG. 19.

On the other hand, in the event that the representative image selection unit 103b makes a positive decision in the step S270, the control device 103 causes the flow of control to proceed to the step S230 described above, in which the representative image selection unit 103b selects the single image specified as an image with proper brightness in the decision processing of the step S270 as a representative image, and causes the flow of control to return to the processing shown in FIG. 19.

Next, the processing when the representative image selection unit 103b makes a negative decision in the step S210 will be explained. In this case, the control device 103 causes the flow of control to proceed to a step S290, in which the representative image selection unit 103b makes a decision as to whether or not an image with proper brightness has been included in the target folder. In the event that the representative image selection unit 103b makes a negative decision, the control device 103 causes the flow of control to proceed to the step S280 described above, in which the representative image selection unit 103b specifies the image captured in the optimal composition from among the images recorded in the target folder. After that, the control device 103 causes the flow of control to proceed to the step S230 described above, the representative image selection unit 103b selects the image captured in the optimal composition specified in the step S280 as a representative image, and causes the flow of control to return to the processing shown in FIG. 19.

On the other hand, in the event that the representative image selection unit 103b makes a positive decision in the step S290, the control device 103 causes the flow of control to proceed to a step S300. In the step S300, the representative image selection unit 103b makes a decision as to whether or not only a single image with proper brightness has been included in the target folder. In the event that the representative image selection unit 103b makes a negative decision, the control device 103 causes the flow of control to proceed to the step S280 described above, in which the representative image selection unit 103b specifies the image captured in the optimal composition from among the images with proper brightness recorded in the target folder. After that, the control device 103 causes the flow of control to proceed to the step S230 described above, in which the representative image selection unit 103b selects the image captured in the optimal composition specified in the step S280 as a representative image, and causes the flow of control to return to the processing shown in FIG. 19.

On the other hand, in the event that the representative image selection unit 103b makes a positive decision in the step S300, the control device 103 causes the flow of control to proceed to the step S230 described above, in which the representative image selection unit 103b selects the single image specified as an image with proper brightness in the decision processing of the step S300 as a representative image, and causes the flow of control to return to the processing shown in FIG. 19.

According to the fourth embodiment explained above, the following operations and advantageous effects can be achieved.

(1) It is arranged that image data having been grouped on a predetermined condition in advance are sorted into folders for each of the groups and recorded in the HDD 104, and the subject recognition unit 103a carries out the subject recognition processing for the image recorded in the HDD 104 so as to recognize the subject included in the image. It is arranged that, based upon the recognition result by the subject recognition unit 103a, the representative image selection unit 103b then sets a selection criterion to select a representative image from among the image files recorded in each of the folders, and based upon the set selection criterion, the representative image selection unit 103b selects the representative image from among the image files recorded in each of the folders. As a result, based upon the selection criterion having been set based upon the recognition result of the subject, an appropriate image as a representative image can be selected from among the images included in the group.

(2) It is arranged that the representative image selection unit 103b causes the thumbnail image of a representative image to be arranged and displayed on the folder icon so as to display information related to the representative image and information related to the group that includes the representative image in association with each other. As a result, by viewing the thumbnail image, the user can comprehend what image group the image recorded in the folder belongs to.

(3) It is arranged that the representative image selection unit 103b makes a decision as to whether or not an image in which a person is captured has been included in the target folder, and, when a decision is made that an image in which a person is captured has been included, carries out the "representative image selection processing in the case of a person photographed" whilst, when a decision is made that an image in which a person is captured has not been included, carries out the "representative image selection processing in the case of a person not photographed". As a result, the selection criterion can be set with priority given to whether a person highly likely to be the main subject has been captured.

(Variation 21)

It is to be noted that the image display device of the embodiment described above can be modified as follows.

(1) In the embodiment described above, it is arranged that the representative image selection unit 103b makes a decision as to whether or not a person is captured in an image, and, based upon the decision result, carries out the "representative image selection processing in the case of a person photographed" shown in FIG. 20 or the "representative image selection processing in the case of a person not photographed" shown in FIG. 21. Then, it is arranged that the condition to select the representative image (selection criterion) is changed between the "representative image selection processing in the case of a person photographed" and the "representative image selection processing in the case of a person not photographed". However, it may also be arranged that a part of the condition to select the representative image is in common between the "representative image selection processing in the case of a person photographed" and the "representative image selection processing in the case of a person not photographed".

In other words, also in the "representative image selection processing in the case of a person photographed", it may also be arranged that at least one of the conditions of whether the image is blurring, whether the main subject is focused on, whether the image has proper brightness, and whether the image is captured in the optimal composition is added so as to select the representative image. In addition, it may also be arranged that another condition is added to "representative image selection processing in the case of a person photographed" and "representative image selection processing in the case of a person not photographed" so as to select the representative image.

(2) In the embodiment described above, an example was explained in which, as shown in FIG. 18, the representative image selection unit 103b causes the thumbnail image of a representative image to be arranged and displayed on the folder icon so as to display information related to the folder that includes the representative image and information related to the representative image in association with each other. However, it may also be arranged that the representative image selection unit 103b uses another method so as to display information related to the folder that includes the representative image and information related to the representative image in association with each other. For instance, it may also be arranged that the representative image selection unit 103b causes the folder name of the folder that includes the representative image and the thumbnail image of the representative image to be displayed in association with each other.

(3) In the embodiment described above, an example in which a personal computer is used as the image display device 100 was explained. However, it may also be arranged that another device or system that can record an image file and display an image is used, for example, a digital camera, a mobile phone, a photo storage device, an online album service using the Internet, or the like.

Fifth Embodiment

In the fourth embodiment, an example was explained, in which, for a folder in which an image file has already been stored, a representative image is selected from among the images stored (recorded) in the said folder. In the fifth embodiment, a selection method of a representative image will be explained, in which a new image file is stored (added) in the folder in which the representative image has already been selected. The representative image selection unit 103b in the fifth embodiment selects the representative image in the following order (1) to (3).

(1) The representative image selection unit 103b saves in the HDD 104 the information obtained when it selected the representative image that has already been selected (information obtained when carried out the processing shown in FIG. 19 to FIG. 21) associated with the said folder. The information to be saved includes the following.

[A] The case in which an image in which a person is captured exists in the said folder (a positive decision is made in the step S20 (FIG. 19))

The information to be saved includes information showing the presence or absence of an image in which a family member or an acquaintance is captured, the number of the said image, the presence or absence of an image in which a face is facing the front, the number of the said image, the presence or absence of an image of a smile, the number of the said image, and the area of a face in an image in which the area of the face is the greatest.

[B] The case in which an image in which a person is captured does not exist in the said folder (a negative decision is made in the step S20 (FIG. 19))

The information to be saved includes information showing the presence or absence of an image determined not to be blurring, the number of the said image, the presence or absence of an image in which the main subject is focused on, the number of the said image, the presence or absence of an image with proper brightness, the number of the said image, the presence or absence of an image captured in the optimal composition, and the number of the said image.

(2) The representative image selection unit 103b performs the decision processing (the same manner as the step S20) as to whether or not a person is captured in an image file to be newly stored (added) in the said folder.

(3) In the event that a person is captured in the image to be newly stored (added), the representative image selection unit 103b carries out the processing shown in FIG. 20. At this time, the representative image selection unit 103b selects the image representing the said folder using information whether the family member or the acquaintance has been captured in the image to be newly stored (added), whether the face captured in the image to be newly stored (added) is facing the front, whether the face captured in the image to be newly stored (added) is a smile, the area of the face captured in the image to be newly stored (added), and the information saved in the HDD 104.

In the event that a person is not captured in the image to be newly stored (added), the representative image selection unit 103b carries out the processing shown in FIG. 21. At this time, the representative image selection unit 103b selects the image representing the said folder using information showing whether the image to be newly stored (added) is an image without blurring, whether the main subject of the image to be newly stored (added) is focused, whether brightness of the image to be newly stored (added) is proper, the image to be newly stored (added) is in the optimal composition, and the information saved in the HDD 104.

According to the fifth embodiment explained above, an appropriate representative image can be selected when a new image file is stored (added) in the folder in which the representative image has been selected. Use of the information saved in the HDD 104 thus allows the processing load of the representative image selection unit 103b and the processing time to be reduced compared to the case in which each of the decision processing is re-performed without using the saved information.

It is to be noted that it may be arranged that, when an image in which a person is not captured is newly stored (added) in the folder in which an image in which a person is captured is stored, the previous representative image in the said folder is designated to be a representative image as it is without carrying out the processing shown in FIG. 20. On the other hand, when an image in which a person is captured is newly stored (added) in the folder in which an image in which a person is not captured is stored, the processing shown in FIG. 20 is carried out, so that the image selected through the processing shown in FIG. 20 (i.e., the new image in which the person is captured) is designated as a representative image, in place of the previous representative image in the said folder.

Sixth Embodiment

In the sixth embodiment, the case will be explained in which a representative image is selected for the folder in which an image for which image correction processing such as exposure compensation and image blur reduction is carried out is stored (recorded). The representative image selection unit 103b in the sixth embodiment selects the representative image in the following order (1) to (2).

(1) The representative image selection unit 103b carries out the processing shown in FIG. 19 to FIG. 21 for the folder in which the representative image is to be selected, more specifically, the representative image selection unit 103b performs the subject recognition processing (step S10) and the decision processing (step S20) whether a person is captured for all the images recorded in the target folder, and, in the event that there is an image in which a person is captured, carries out the processing shown in FIG. 20, whilst in the event that there is not an image in which a person is captured, carries out the processing shown in FIG. 21.

(2) When the processing shown in FIG. 20 has been carried out, the representative image selection unit 103b causes the representative image selected in the processing of FIG. 20 to be arranged and displayed in the folder icon (step S60). The representative image selection unit 103b causes the representative image selected in the processing of FIG. 21 to be arranged and displayed in the folder icon (step S60).

According to the sixth embodiment described above, selection of a representative image can be performed appropriately even for the folder in which an image for which image processing such as exposure compensation and image blur reduction is carried out is stored.

(Variation 22)

It may also be arranged that the following processing (A) to (G) is performed in place of the processing of the step S280 in the sixth embodiment (to specify an image captured in the optimal composition from among images recorded in as folder) or in combination with the processing of the step S280. In the event that a plurality of images for which image processing such as exposure compensation and image blur reduction is carried out are stored, a plurality of images with proper brightness and without image blurring exist, and then it becomes difficult to specify a single image. In variation 22, therefore, any of the following processing (A) to (G) is performed so as to make an image easy to specify. It is to be noted that a plurality of the processing (A) to (G) may be arbitrarily combined.

(A) The representative image selection unit 103b specifies an image captured during a period of time in which shooting frequency is greater. For instance, with reference to shooting time information recorded as additional information, e.g., Exif information in the image file, the representative image selection unit 103b calculates the distribution of shooting time of an image recorded in the said folder so as to specify the image captured during a period of time in which the shooting times are most concentrated. Since a great shooting frequency indicates that a subject of high concern or interest to the user has been highly likely to be captured, such an image is preferable as a representative image.

(B) The representative image selection unit 103b specifies an image having a greater number of pixels. For example, the representative image selection unit 103b calculates pixel number information (data size) of an image recorded in the said folder so as to specify the finest image. A clear image is preferable as a representative image.

(C) The representative image selection unit 103b specifies the image that has been viewed more frequently. For instance, with reference to viewing frequency information for each image recorded in the said folder, the representative image selection unit 103b specifies the image that has been viewed most frequently. In this case, the representative image selection unit 103b counts the number of times in which the image file is read out (the number of times of access) after the image file was recorded in the said folder, and causes counting information for each image file to be associated with the said folder and to be saved in the HDD 104. Since a frequent access indicates that a subject of high concern or interest to the user has been highly likely to be captured, such an image is preferable as a representative image.

(D) The representative image selection unit 103b specifies an image whose edge histogram or color histogram is nearer to the average value of all the images recorded in the said folder. Since information of the average histogram of the images in the folder is highly likely to reflect the characteristics of a subject image of high concern or interest to the user, an average image is preferable as a representative image.

(E) The representative image selection unit 103b calculates the distribution of shooting time of images recorded in the said folder so as to specify the image with the earliest shooting time.

(F) The representative image selection unit 103b calculates the distribution of shooting time of images recorded in the said folder so as to specify the image with the last shooting time.

(G) The representative image selection unit 103b calculates the distribution of shooting time of images recorded in the said folder so as to specify the image captured at the middle of a predetermined period of time among those included in the said period of time.

Seventh Embodiment

In the seventh embodiment, the case will be explained in which an image stored in the folder for which the representative image has already been selected undergoes image correction processing such as exposure compensation and image blur reduction after the representative image has been selected. In this case, although the representative image selection unit 103b newly performs selection processing of a representative image after the image correction processing has been performed, it carries out only the processing shown in FIG. 20 or the processing shown in FIG. 21 without carrying out the processing shown in FIG. 19.

More specifically, the processing shown in FIG. 20 is carried out if an image in which a decision is made that a person is captured has been selected as the previous representative image, and the processing shown in FIG. 21 is carried out if an image in which a decision is made that a person is not captured has been selected as the previous representative image.

According to the seventh embodiment described above, the representative image can be selected again according to requirements in the event that the image processing such as exposure compensation and image blur reduction is carried out afterwards for the image in the folder for which the representative image has already been selected.

In the seventh embodiment, it may also be arranged that, when an image in which a decision is made that a person is not captured has been selected as the previous representative image, the previous representative image in the said folder is designated as a representative image as it is without newly performing the selection processing of the representative image (in this example, the processing shown in FIG. 20). This is because, when at least only one of the image blur reduction and the exposure compensation has been performed as image correction processing, even if the processing shown in FIG. 20 is perforated for the folder that includes the image having undergone the said image correction processing, the representative image to be selected is the same as the representative image of the said folder selected previously (prior to the image correction processing).

However, in the event that processing (for instance, smile correction processing or the like) other than the image blur reduction exposure compensation has been performed as image correction processing, the selection processing of the representative image (in this example, the processing shown in FIG. 20) is newly performed. This is because, when the processing shown in FIG. 20 is performed for the folder that includes the image having undergone the said smile correction processing, the representative image to be selected may be different from the representative image of the said folder selected previously (prior to the smile correction processing).

Although a variety of embodiments and variations have been explained in the above explanations, the present invention is not limited to those. Other modes which may be conceived of within the range of the technical concept of the present invention are also included within the range of the present invention. In addition, the embodiments and the variations described above may be arranged arbitrarily in combination therewith.

The disclosures of the following priority applications are herein incorporated by reference:

Japanese Patent Application No. 2008-8990 (filed Jan. 18, 2008)

Japanese Patent Application No. 2008-113706 (filed Apr. 24, 2008)

Japanese Patent Application No. 2008-113707 (filed Apr. 24, 2008)

Japanese Patent Application No. 2008-113708 (filed Apr. 24, 2008)

Japanese Patent Application No. 2008-113709 (filed Apr. 24, 2008)

The invention claimed is:

1. An image display device, comprising:
a processor configured to:
perform subject recognition processing on a plurality of images in a group, the subject recognition processing recognizing a subject in each of the images, the images being classified into the group;
make a decision as to whether or not at least one image with a person captured is included in the plurality of images in the group based on a recognition result of the subject recognition processing;
when a decision is made that at least one image with the person captured is included in the plurality of images in the group, set a first selection criterion for selecting a representative image from the plurality of images in the group;
when a decision is made that an image in which the person is captured is not included in the plurality of images in the group, set a second selection criterion for selecting the representative image from the plurality of images in the group; and
select, an image from the plurality of images in the group to be the representative image, based on the first selection criterion in a case that at least one image with the person captured is included in the plurality of images in the group, or based on the second selection criterion in a case that at least one image with the person captured is not included in the plurality of images in the group, wherein
the first selection criteria is a selection criterion used to select the representative image based upon a face of the person captured in the image.

2. The image display device according to claim 1, further comprising: a display configured to display information related to the representative image and information related to the group that includes the representative image in association with each other.

3. The image display device according to claim 1, wherein the first selection criterion is a selection criterion used to select the representative image by making a decision as to whether or not the face of the person is a face of a family member or an acquaintance, whether or not the face of the person is facing frontward, whether or not the face of the person is smiling, or whether or not an area of the face of the person is a greatest face area.

4. The image display device according to claim 1, wherein the second selection criterion is a selection criterion used to select the representative image by making a decision as to whether or not the image is not blurring, whether or not the image has a main subject in focus, whether or not the image has proper brightness, or whether or not the image is captured in an optimal composition.

5. A non-transitory computer readable medium having an image display program embedded therein, the image display program, when executed by a computer, causing the computer to:
perform subject recognition processing on a plurality of images in a group, the subject recognition processing recognizing a subject in the image, the images being classified into the group;
make a decision as to whether or not at least one image with a person captured is included in the plurality of images in the group based upon a recognition result of the subject recognition processing; and
when a decision is made that at least one image with the person captured is included in the plurality of images in the group, set a first selection criterion for selecting a representative image from the plurality of images in the group;
when a decision is made that an image in which a person is captured is not included in the plurality of images in the group, set a second selection criterion for selecting the representative image from the plurality of images in the group; and
select an image from the plurality of images in the group to be a representative image based on the first selection criterion in a case that at least one image with the person captured is included in the plurality of images in the group, or based on the second selection criterion in a case that at least one image with the person captured is not included in the plurality of images in the group, wherein
the first selection criteria is a selection criterion used to select the representative image based upon a face of the person captured in the image.

6. The non-transitory computer readable medium according to claim 5, wherein the image display program further causes the computer to cause information related to the representative image and information related to the group that includes the representative image to be displayed in association with each other.

7. The non-transitory computer readable medium according to claim 5, wherein the first selection criterion is a selection criterion to select the representative image by making a decision as to whether or not the face of the person is a face of a family member or an acquaintance, whether or not the face of the person is facing frontward, whether or not the face of the person is smiling, and whether or not an area of the face of the person is of a quality that is better than a predetermined level of quality.

8. The non-transitory computer readable medium according to claim 5, wherein the second selection criterion is a selection criterion used to select the representative image by making a decision as to whether or not the image is not blurring, whether or not the image has a main subject in focus, whether or not the image has proper brightness, and whether or not the image is captured in a composition better than a predetermined quality level of composition.

* * * * *